United States Patent
Bernard

(10) Patent No.: US 11,673,070 B1
(45) Date of Patent: Jun. 13, 2023

(54) METHODS AND SYSTEMS FOR ARRANGING SEATS FOR AUDIENCE MEMBERS AND MUSICIANS

(71) Applicant: InsideOut Concerts, Inc., New York, NY (US)

(72) Inventor: David Bernard, New York, NY (US)

(73) Assignee: INSIDEOUT CONCERTS, INC., New York, NY (US)

( * ) Notice: Subject to any disclaimer, the term of this patent is extended or adjusted under 35 U.S.C. 154(b) by 608 days.

(21) Appl. No.: 16/443,475

(22) Filed: Jun. 17, 2019

(51) Int. Cl.
| | |
|---|---|
| A63J 3/00 | (2006.01) |
| A47C 1/12 | (2006.01) |
| G06Q 10/02 | (2012.01) |
| G06Q 10/063 | (2023.01) |

(52) U.S. Cl.
CPC .............. *A63J 3/00* (2013.01); *A47C 1/12* (2013.01); *G06Q 10/02* (2013.01); *G06Q 10/063* (2013.01)

(58) Field of Classification Search
None
See application file for complete search history.

(56) References Cited

U.S. PATENT DOCUMENTS

| | | | |
|---|---|---|---|
| 3,394,505 A * | 7/1968 | Rife .................. | E04H 3/22 52/10 |
| 10,398,990 B2 * | 9/2019 | Fox .................... | E04H 3/26 |

OTHER PUBLICATIONS

Wikipedia published article "Theater (structure)", Mar. 23, 2018, Wikipedia, printed through www.archive.org, date is in the URL in YYYYMMDD format (Year: 2018).*
Royal oak music theatre ticket, Aug. 24, 2016, www.oneofthethree.com (Year: 2016).*
AA Cristi, Sit with the Orchestra in this 360-Degree Sneak Peek of David Bernards InsideOut Concerts, Oct. 23, 2017, www.BroadwayWorld.com (Year: 2017).*
Elmer E. Smalling III, Designing a Television Theater, 1969, Journal of the SMPTE, vol. 78, pp. 34-38 (Year: 1969).*
Bennett, "Inside Out is Transforming the Traditional Concert Experience," Published by WQXR Blog, Mar. 2, 2017, 6 pages. Retrieved from Internet: <https://www.wqxr.org/story/seeing-sound-how-inside-out-upending-traditional-classical-experience/>.
BWW News Desk, "Video: Sit with the Orchestra in This 360-Degree Sneak Peek of David Bernard's 'InsideOut' Concerts" including screen captures, Oct. 23, 2017, 7 pages. Retrieved from Internet: <https://www.broadwayworld.com/bwwclassical/article/Attending-A-Concert-Seated-Inside-An-Orchestra-A-360-Degree-Video-Sneak-Peek-Of-David-Bernards-InsideOut-Concerts-20171023>.

(Continued)

*Primary Examiner* — Naresh Vig
(74) *Attorney, Agent, or Firm* — Cooley LLP

(57) ABSTRACT

Methods and systems for arranging audience members and musicians are described herein. An assembly of seats for an event location includes a plurality of musician seats and a plurality of audience seats. Each audience seat of the plurality of audience seats can be disposed in a particularly designated location on an event location surface relative to the plurality of musician seats such that each audience seat of the plurality of audience seats has an audience immersion score that is above a threshold minimal acceptable audience immersion score (MAAIS). The audience immersion score includes a musician adjacency component, a conductor position depth offset component, and a conductor position lateral offset component.

20 Claims, 12 Drawing Sheets

(56) References Cited

OTHER PUBLICATIONS

Daily Mail, "Seeking new audience, conductor turns orchestra 'inside out'," Nov. 4, 2017, 4 pages. Retrieved from Internet: <http://dailym.ai/2A6Xpul>.

Danish, "BWW Review: The Park Avenue Chamber Symphony Performs Mahler's 1st Symphony at The Church of The Good Shepard," May 18, 2018, 3 pages. Retrieved from Internet: <https://www.broadwayworld.com/bwwopera/article/BWW-Review-THE-PARK-AVENUE-CHAMBER-SYMPHONY-PERFORMS-MAHLERS-1ST-SYMPHONY-at-The-Church-Of-The-Good-Shepard-20180518>.

Fernandez, "Bringing the Audience Into the Orchestra," Jan. 19, 2016, 11 pages. Retrieved from Internet: <https://www.theepochtimes.com/bringing-the-audience-into-the-orchestra_1944991.html>.

ICOA Presents: Artists' Journey by International Chamber Orchestra of America, obtained as of Mar. 19, 2019, 5 pages. Retrieved from Internet: <https://www.eventbrite.com/elicoa-presents-artists-journey-tickets-57133127723>.

Schweitzer, "Surround Sound," Symphony, Spring 2019 Issue, Copyright 2019, obtained as of Apr. 1, 2019, 7 pages.

Simon, "'Inside Out' concert sits the audience among the orchestra," Jul. 21, 2018, 3 pages. Retrieved from Internet: <https://www.ny1.com/nyc/all-boroughs/spotlight-ny/2018/07/21/-inside-out-concert-sits-the-audience-among-the-orchestra?cid=share_twitter>.

Screen captures from Vimeo video clip entitled "Inside Out Concerts," 6 pages, uploaded Jul. 26, 2018 by user Sean McNulty. Retrieved from Internet: <https://vimeo.com/281793996>.

* cited by examiner

| I | I | I | I | I |
|---|---|---|---|---|
| I | D | D | D | I |
| I | D | A | D | I |
| I | D | D | D | I |
| I | I | I | I | I |

800

---

802 — Determine an audience immersion score for each audience seat of a plurality of audience seats including a first audience immersion score associated with a first audience seat of the plurality of audience seats and a second audience immersion score associated with a second audience seat of the plurality of audience seats, each of the first audience immersion score and the second audience immersion score including a musician adjacency component, a conductor position depth offset component, and a conductor position lateral offset component

↓

804 — Assign an audience member to the first audience seat of the plurality of audience seats for a first time period of an event

↓

806 — Assign the audience member to the second audience seat of the plurality of audience seats for a second time period of the event and not overlapping with the first time period based, at least in part, on the first audience immersion score and the second audience immersion score

↓

808 — Provide an instruction to the audience member to move from the first audience seat to the second audience seat after the first time period and before the second time period

Dispose a plurality of musician seats including a first set of musician seats, a second set of musician seats, a third set of musician seats, and a fourth set of musician seats on an event location surface such that each of the first set of musician seats, the second set of musician seats, the third set of musician seats, and the fourth set of musician seats includes a line of musician seats extending radially away from a conductor position

904

Calculate an audience immersion score of a location on the event location surface, the audience immersion score including a musician adjacency component, a conductor position depth offset component, and a conductor position lateral offset component

906

Determine whether the audience immersion score is above a threshold minimal acceptable audience immersion score (MAAIS)

908

In response to determining that the audience immersion score of the location is above the threshold MAAIS, dispose an audience chair at the location on the surface

```
┌─────────────────────────────────────────────────────────────────────────┐
│ Assign an audience member to a first set of audience seats of a         │  1002
│ plurality of sets of audience seats for a first time period of an event │
└─────────────────────────────────────────────────────────────────────────┘
                                    │
                                    ▼
┌─────────────────────────────────────────────────────────────────────────┐
│ Assign the audience member to a second set of audience seats of the     │
│ plurality of sets of audience seats for a second time period of the     │  1004
│ event and not overlapping with the first time period based, at least    │
│ in part, on a location of the first set of audience seats relative to   │
│ one or more musician seats and a location of the second set of          │
│ audience seats relative to one or more musician seats                   │
└─────────────────────────────────────────────────────────────────────────┘
                                    │
                                    ▼
┌─────────────────────────────────────────────────────────────────────────┐
│ Provide an instruction to the audience member to move from the first    │  1006
│ set of audience seats to the second set of audience seats after the     │
│ first time period and before the second time period                     │
└─────────────────────────────────────────────────────────────────────────┘
```

FIG. 12

METHODS AND SYSTEMS FOR ARRANGING SEATS FOR AUDIENCE MEMBERS AND MUSICIANS

BACKGROUND

Embodiments described herein relate to methods and systems for arranging seats for audience members and musicians. Specifically, embodiments described herein relate to methods and systems for arranging seats for audience members and musicians relative to each other to improve audience immersion within an assembly of musicians (e.g., an orchestra).

Adoption and consumption of classical music (e.g., symphonies by Beethoven, Brahms, Mozart, or Schubert) by the overall public has declined significantly over the past few decades. Among those who are dedicated consumers of classical music, however, including those who have become classical musicians, there is a life-long affinity and desire to experience classical music. The difference between dedicated consumers of classical music and disinterested members of the public can be due, at least in part, to the dedicated consumers having had immersive classical music experiences in their past (e.g., rehearsing and/or performing as part of a school band, orchestra, or chorus). The lack of this experience in the background of potential audience members for classical music—likely the result of reduced exposure of children to classical music during childhood and reduced funding of music education programs—may be the root cause of the difference between those who are dedicated consumers of classical music and those who are not. Contributing to the decline of the size and/or dedication of classical music audiences is the public's increasing demand for live events to deliver heightened experience and interaction, as classical music events have not successfully held audience experience and interaction as priorities. In contrast to the audience experience in a traditional full symphonic orchestra concert, members of the orchestra, the most dedicated classical music consumers, benefit from being audially, visually, and physically engaged with other members of the orchestra and the conductor both with respect to the members enjoyment of the orchestra performance and with respect to being able to perform at a high level due to the engagement with other members of the orchestra and the conductor.

Thus, a need exists for methods and systems of arranging seats for audience members and musicians that balance the desire for increased immersion of the audience within an assembly of musicians and the benefits of grouping musicians near other musicians and with visibility between a conductor and the musicians.

SUMMARY

Methods and systems for arranging audience members and musicians are described herein. In some embodiments, an assembly of seats for an event location includes a plurality of musician seats and a plurality of audience seats. Each audience seat of the plurality of audience seats can be disposed in a particularly designated location on an event location surface relative to the plurality of musician seats such that each audience seat of the plurality of audience seats has an audience immersion score that is above a threshold minimal acceptable audience immersion score (MAAIS). The audience immersion score includes a musician adjacency component, a conductor position depth offset component, and a conductor position lateral offset component. For each audience seat from the plurality of audience seats, the musician adjacency component has a direct musician adjacency subcomponent based, at least in part, on a number of musician seats directly adjacent to that audience seat and an indirect musician adjacency subcomponent based, at least in part, on a number of musician seats indirectly adjacent to that audience seat. The conductor position depth offset component can be based, at least in part, on a distance between a conductor position and that audience seat along a centerline of the system extending through the conductor position. The conductor position lateral offset component can be based, at least in part, on a lateral distance between the centerline and that audience seat.

BRIEF DESCRIPTION OF THE DRAWINGS

FIG. 10 is a flow chart showing a method of assembling seats for an event location, according to an embodiment.

FIG. 11 is a flow chart showing a method of assembling seats for an event location, according to an embodiment.

FIG. 12 is a flow chart showing a method of assembling seats for an event location, according to an embodiment.

DETAILED DESCRIPTION

In some embodiments, an assembly of seats for an event location includes a plurality of musician seats and a plurality of audience seats. Each audience seat of the plurality of audience seats can be disposed in a particularly designated location on an event location surface relative to the plurality of musician seats such that each audience seat of the plurality of audience seats has an audience immersion score that is above a threshold minimal acceptable audience immersion score (MAAIS). The audience immersion score includes a musician adjacency component, a conductor position depth offset component, and a conductor position lateral offset component. For each audience seat from the plurality of audience seats, the musician adjacency component has a direct musician adjacency subcomponent based, at least in part, on a number of musician seats directly adjacent to that audience seat and an indirect musician adjacency subcomponent based, at least in part, on a number of musician seats indirectly adjacent to that audience seat. The conductor position depth offset component can be based, at least in part, on a distance between a conductor position and that audience seat along a centerline of the system extending through the conductor position. The conductor position lateral offset component can be based, at least in part, on a lateral distance between the centerline and that audience seat.

Methods and systems for arranging seats for audience members and musicians described herein can include arranging seats for audience members and musicians relative to each other to improve audience immersion within an assembly of musicians (e.g., an orchestra). The audience member seats and musician seats can be arranged such that audience immersion scores are improved and such that disturbance of audial and visual connections between musician seats, groups of musician seats, and/or a conductor location, music stand, and/or seat is minimized.

Figure 1:
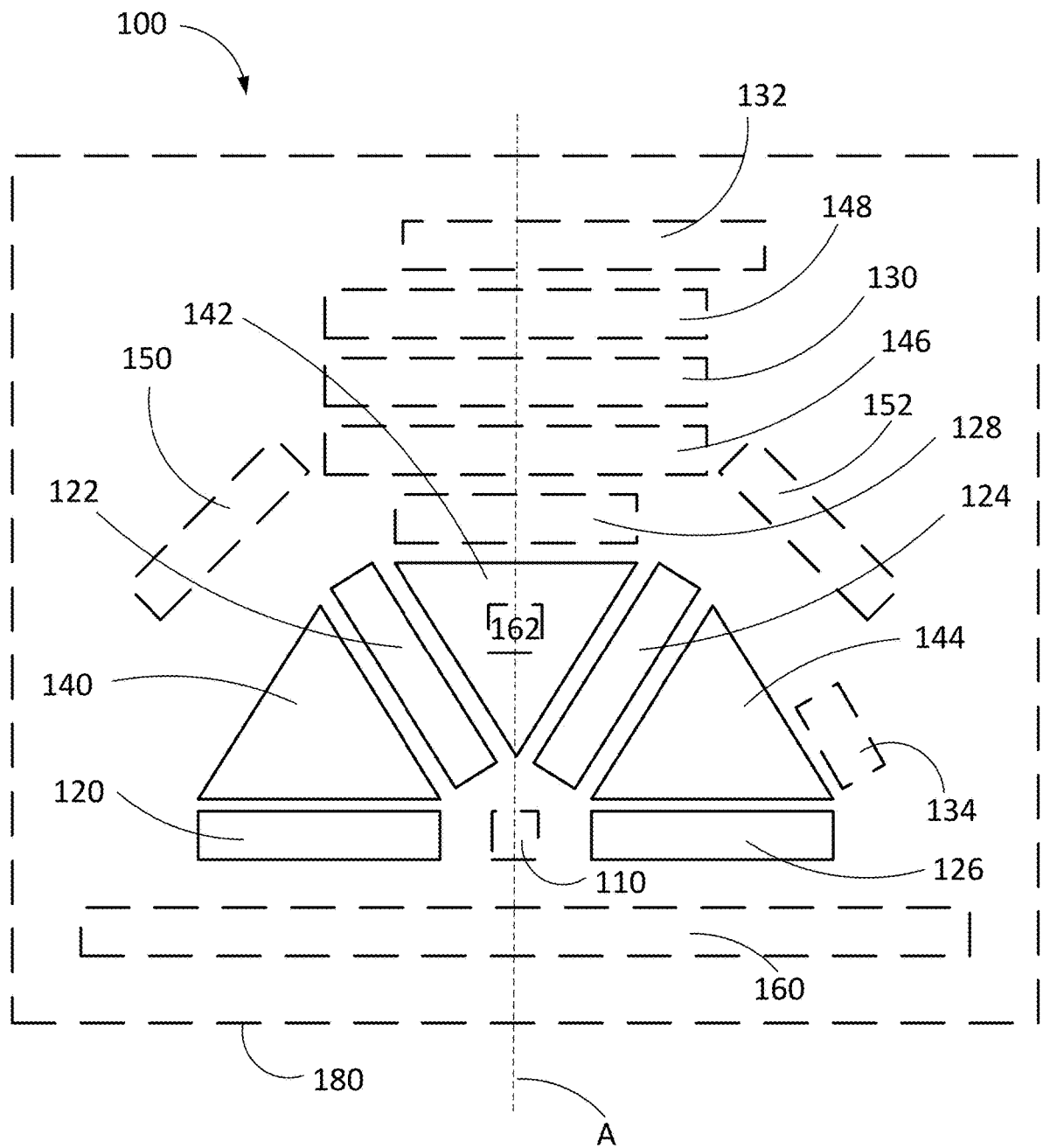
FIG. 1 is a schematic illustration of an assembly of audience member seats and musician seats, according to an embodiment.

FIG. 1 is a schematic illustration of an assembly 100 of seats for an event location, according to an embodiment. The assembly 100 includes a plurality of musician seats and a plurality of audience seats. The event location can include an event surface 180 (e.g., an event floor and/or an event stage). The plurality of musician seats and the plurality of audience seats can be arranged (e.g., disposed) on the event surface 180. The plurality of musician seats can include a seat for each member of a full orchestra such as a symphonic orchestra (e.g., a small, medium, or large-sized orchestra).

The plurality of musician seats includes multiple sets of musician seats. The multiple sets of musician seats include a first set of musician seats 120, a second set of musician seats 122, a third set of musician seats 124, and a fourth set of musician seats 126. Each of the first set of musician seats 120, the second set of musician seats 122, the third set of musician seats 124, and the fourth set of musician seats 126 includes at least one line of musician seats extending radially away from a conductor position 110.

The conductor position 110 can include a music stand associated with a conductor, a seat associated with the conductor, an indicator on the event surface 180 indicating the intended location of the conductor during a performance or a portion of the performance, and/or an area of the event surface 180 within which the conductor remains during a performance or a portion of the performance. The seat associated with the conductor can include any suitable stool or chair.

In some implementations, rather than including a plurality of musician seats, any of the sets of musician seats (e.g., the first set 120) described herein can include a plurality of music stands (e.g., each music stand associated with a particular musician or pair of musicians who can sit or stand adjacent to the music stand), a plurality of indicators on the event surface 180 indicating a location in which a musician is to stand or sit (e.g., a marker such as tape, chalk, or paper disposed on the event surface 180), and/or a combination of music stands, musician indicators, and/or musician seats. Additionally, each musician seat described herein can be any suitable seat on which a musician can sit during a performance (e.g., while playing an instrument), such as a stool, a chair, or a bench.

In some implementations, each of the first set of musician seats 120, the second set of musician seats 122, the third set of musician seats 124, and the fourth set of musician seats 126 include two lines of musician seats (e.g., a first line of musician seats and a second line of musician seats) extending radially away from the conductor position 110. The first line of musician seats within each set of musician seats can extend parallel to the second line of musician seats within each set of musician seats. Thus, each of the first set of musician seats 120, the second set of musician seats 122, the third set of musician seats 124, and the fourth set of musician seats 126 can include more than one pair of musicians arranged in a line extending away from the conductor position 110.

The plurality of audience seats includes a first set of audience seats 140, a second set of audience seats 142, and a third set of audience seats 144. The first set of audience seats 140 is disposed between the first set of musician seats 120 and the second set of musician seats 122. The second set of audience seats 142 is disposed between the second set of musician seats 122 and the third set of musician seats 124. The third set of audience seats 144 is disposed between the third set of musician seats 124 and the fourth set of musician seats 126. Each of the first set of audience seats 140, the second set of audience seats 142, and the third set of audience seats 144 can include a plurality of rows of audience seats. Each of the first set of audience seats 140, the second set of audience seats 142, and the third set of audience seats 144 can have a profile (e.g., overall shape of the arrangement of the set on the event surface 180) that is tapered toward the conductor position 110 such that each of the first set of audience seats 140, the second set of audience seats 142, and the third set of audience seats 144 includes rows with fewer seats disposed closer to the conductor position 110 compared to rows with higher numbers of seats.

Each of the first set of audience seats 140, the second set of audience seats 142, and the third set of audience seats 144 can include the same number of rows of audience seats as musicians in each line of the first set of musician seats 120, the second set of musician seats 122, the third set of musician seats 124, and the fourth set of musician seats 126. In some implementations, each musician seat in each line of the second set of musician seats 122 and the third set of musician seats 124 can be disposed adjacent an audience seat disposed at the end of a row of either the first set of audience seats 140, the second set of audience seats 142, and the third set of audience seats 144. Similarly, each musician seat from a line of musician seats of the first set of musician seats 120 disposed closest to the first set of audience seats 140 can be disposed adjacent to the end of a row of the first set of audience seats 140. Each musician seat from a line of musician seats of the fourth set of musician seats 126 disposed closest to the third set of audience seats 144 can be disposed adjacent to the end of a row of the third set of audience seats 144.

In some implementations, each row of audience seats included in a set of audience seats can be disposed in a substantially straight line (e.g., side-by-side). Each row of audience seats within a set of audience seats can face the conductor position 110 and be disposed such that the row is substantially perpendicular to a line passing through the conductor position 110. The second set of audience seats 142, for example, can include a plurality of rose of audience seats, the centerpoint of each row disposed along a centerline A of the assembly 100 passing through the conductor position 110. In some implementations, each row of audience seats included in a set of audience seats can be disposed along an arch, and the center of the arch can be disposed substantially perpendicular to a line passing through the conductor position 110.

A row of audience seats included in each of the first set of audience seats 140, the second set of audience seats 142, and the third set of audience seats 144 disposed closer to the conductor position 110 can include a fewer number of audience seats than rows of audience seats from that set of audience seats disposed farther from the conductor position 110. For example, a row of audience seats included in each of the first set of audience seats 140, the second set of audience seats 142, and the third set of audience seats 144 that is the closest to the conductor position 110 compared to other rows in the same set can include a fewer number of audience seats than remaining rows of audience seats from that set of audience seats 142. A row of audience seats included in each of the first set of audience seats 140, the second set of audience seats 142, and the third set of audience seats 144 that is the second-closest to the conductor position 110 can include a fewer number of audience seats than remaining rows of audience seats from that set of audience seats 142 not including the closest row.

In some implementations, rather than including a plurality of audience seats, any of the sets of audience seats (e.g., the first set 140) described herein can include a plurality of indicators on the event surface 180 indicating a location in which an audience member is to stand or sit (e.g., a marker such as tape, chalk, or paper disposed on the event surface 180), and/or a combination of audience member indicators, and/or audience seats. Additionally, each audience seat described herein can be any suitable seat on which an audience member can sit during a performance, such as a stool, a chair, a floor cushion, or a bench.

In some implementations, the plurality of musician seats of the assembly 100 can optionally include additional sets of musician seats. For example, the assembly 100 can include a fifth set of musician seats 128. The fifth set of musician seats 128 can include a row of musician seats. The row of musician seats in the fifth set of musician seats 128 can be disposed in a substantially straight line (e.g., side-by-side) substantially perpendicular to a centerline A of the system extending through the conductor position 110. The row of musician seats in the fifth set of musician seats 128 can be disposed behind and adjacent to a row of audience seats in the second set of audience seats 142 that is farthest from the conductor position 110. In some implementations, the musician seats within the fifth set of musician seats 128 can be disposed (e.g., based on their number and spacing) such that the musician seats within the fifth set of musician seats 128 have a greater end-to-end length than the length of the row of audience seats in the second set of audience seats 142 that is farthest from the conductor position 110.

In some implementations, the plurality of audience seats of the assembly 100 can optionally include additional sets of audience seats. For example, the assembly 100 can include a fourth set of audience seats 146. The fourth set of audience seats 146 can include a row of audience seats. The row of audience seats in the fourth set of audience seats 146 can be disposed in a substantially straight line (e.g., side-by-side) substantially perpendicular to a centerline A of the system extending through the conductor position 110. The row of audience seats in the fourth set of audience seats 146 can be disposed behind and adjacent to the fifth set of musician seats 128. In some implementations, the audience seats within the fourth set of audience seats 146 can be disposed (e.g., based on their number and spacing) such that the audience seats within the fourth set of audience seats 146 have a greater end-to-end length than the length of the row of musician seats in the fifth set of musician seats 128.

In some implementations, the assembly 100 can optionally include additional alternating sets of musician seats and audience seats. For example, the assembly 100 can include a sixth set of musicians seats 130 that can be the same or similar in structure and/or function to the fifth set of musician seats 128. The sixth set of musician seats 130 can be disposed behind and adjacent to the fourth set of audience seats 146. Additionally, the assembly 100 can include a fifth set of audience seats 148. The fifth set of audience seats 148 can be the same or similar in structure and/or function to the fourth set of audience seats 146. The fifth set of audience seats 148 can be disposed behind and adjacent to the sixth set of musician seats 130.

The assembly 100 can optionally include a seventh set of musician seats 132 that can be the same or similar in structure and/or function to the fifth set of musician seats 128. The seventh set of musician seats 133 can be disposed behind and adjacent to the fifth set of audience seats 148. The seventh set of musician seats 133 can also be disposed off-center from the conductor position 110 relative to the centerline A. In some implementations, the assembly 100 can include any suitable number of alternating sets of musician seats and audience seats.

The assembly 100 can also include additional sets of audience seats disposed asymmetrically relative to the centerline A and a greater distance from the conductor position 110 than the first set of audience seats 140, the second set of audience seats 142, and the third set of audience seats 144. For example, the assembly 100 can optionally include an eighth set of audience seats 150 and a ninth set of audience seats 152. Each of the eighth set of audience seats 150 and the ninth set of audience seats 152 can include a row of audience seats. Each row of the eighth set of audience seats 150 can extend in a straight line and can be disposed at an angle relative to the centerline A that is equal to or greater than the angle of the rows of seats included in the first set of audience seats 140 relative to the centerline A. Each row of the ninth set of audience seats 152 can extend in a straight line and can be disposed at an angle relative to the centerline A that is equal to or greater than the angle of the rows of seats included in the third set of audience seats 144 relative to the centerline A. In some implementations, the eighth set of audience seats 150 and the ninth set of audience seats 152 can be disposed symmetrically about the centerline A. The eight set of audience seats 150 can be disposed adjacent a first end of the fourth set of audience seats 146 and the ninth set of audience seats 152 can be disposed adjacent a second end of the fourth set of audience seats 146.

In some implementations, the assembly 100 can optionally include an eighth set of musician seats 134 that can be the same or similar in structure and/or function to any of the other sets of musician seats described herein. The eighth set of musician seats 134 can be disposed behind and adjacent to the third set of audience seats 144. The eighth set of musician seats 134 can be disposed asymmetrically relative to the centerline A. Furthermore, the eighth set of musician seats 134 can be disposed asymmetrically relative to a centerline of the rows of the third set of audience seats 144 (e.g., a centerline of the rows of the third set of audience seats 144 that passes through the conductor position 110). In some implementations, rather than including seats, the eighth set of musician seats 134 can include a number of music stands and/or musician location indicators.

In some implementations, a musician seat can be optionally disposed in or near the center of a set of audience seats such that the audience seats in the set surround the musician seat. For example, a musician seat 162 (e.g., a solo musician seat) can be disposed in or near the center of the second set of audience members 142. Additionally or alternatively, although not shown in FIG. 1, a musician seat 162 can also be disposed in or near the center of the first set of audience members 140 and/or in or near the center of the third set of audience members 144.

Each of the sets of audience member seats and musician seats can include any suitable number of seats and/or seats per row. For example, in some embodiments, each of the first set of audience members 140, the second set of audience members 142, and the third set of audience members 144 can include six rows. The first row of the six rows can include two seats and the last row of the six rows can include thirteen seats, with rows two to five including an increasing number of seats between two and thirteen.

Each of the sets of musician seats can be assigned to any suitable type or grouping of musicians. For example, in some implementations, the first set of musician seats 120 and the second set of musician seats 122 can be assigned to musicians playing violins and/or musicians playing violas. The third set of musician seats 124 and the fourth set of musician seats 126 can be assigned to musicians playing violas and/or cellos. The eighth set of musician seats 134 can be assigned to musicians playing string basses. The fourth set of musician seats 146 can be assigned to musicians playing wind instruments (e.g., oboes, flutes, piccolo, clarinets, and/or bassoons). The fifth set of musician seats 148 can be assigned to musicians playing brass instruments (e.g., French horns, trumpets, trombones, and/or tubas). The sixth set of musician seats 132 can be assigned to musicians playing timpani, percussion, piano, and/or harp. In some implementations, the musician seats can be assigned to other types of performers, such as vocalists and/or dancers.

In some implementations, the assembly 100 can optionally include a tenth set of audience seats 160. The tenth set of audience seats 160 can be the same or similar in structure and/or function as any of the sets of audience seats described herein. The tenth set of audience seats 160 can include one or more rows of audience seats that extend any suitable length away from the centerline A. In some implementations, the seats in the tenth set of audience seats 160 can be used as seats for audience members to sit in during a performance or portion of a performance. In some implementations, the seats in the tenth set of audience seats 160 can be used as a temporary staging area or waiting area for a number of audience members to wait within after leaving an initial set of audience seats and before progressing to a secondary set of audience seats. In some implementations, rather than the tenth set of audience seats 160 including audience seats, the tenth set of audience seats 160 can include a marked region of the event surface 180 within which audience members can stand.

In some embodiments, audience seats and musician seats can be arranged relative to one another to increase audience immersion and improve audience experience. For example, the audience seats can be arranged relative to the musician seats such that each audience seat in an assembly can have an audience immersion score above a threshold minimal acceptable audience immersion score (MAAIS). The audience immersion score can includes a musician adjacency component, a conductor position depth offset component, and a conductor position lateral offset component.

Figure 3:
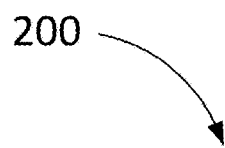
FIG. 3 is a schematic illustration of direct and indirect adjacency location relative to an audience seat, according to an embodiment.

The musician adjacency component can include a direct musician adjacency subcomponent and an indirect musician adjacency subcomponent. The direct musician adjacency subcomponent can include a particular point award based on how many musician seats and/or musician locations are disposed directly adjacent to an audience seat. In some implementations, a musician seat can be directly adjacent to an audience seat if a straight path between the musician seat and the audience seat is unobstructed (e.g., by another seat) and the distance between the musician seat and the audience seat is below a threshold distance. For example, the threshold distance can be below five feet, below three feet, or below eight feet. In some implementations, a musician seat is indirectly adjacent to an audience seat when the musician seat is disposed one seat away from the audience seat along a radial line extending from the audience seat. The particular point award included as the direct musician adjacency subcomponent of the musician adjacency component can be, for example, one point per musician seat that is directly adjacent to the audience seat. The maximum number of musician seats that can be directly adjacent to an audience seat can be, for example, eight. For example, musician seats can be disposed relative to an audience seat in front, behind, to the right, to the left, and diagonally in four directions (e.g., to the front-right, to the front-left, to the back-right, and to the back-left). FIG. 3 shows a schematic illustration of direct adjacency locations D relative to an audience seat A.

The indirect musician adjacency subcomponent can include a particular point award based on how many musician seats and/or musician locations are disposed indirectly adjacent to an audience seat. In some implementations, a musician seat can be indirectly adjacent to an audience seat if a straight path between the musician seat and a musician seat that is directly adjacent to the audience seat is unobstructed (e.g., by another seat) and the distance between the musician seat and a musician seat that is directly adjacent to the audience seat is below a threshold distance. For example, the threshold distance can be below five feet, below three feet, or below eight feet. In some implementations, a musician seat is indirectly adjacent to an audience seat when the musician seat is disposed two seats away from the audience seat along a radial line extending from the audience seat. The particular point award included as the indirect musician adjacency subcomponent per indirectly adjacent seat is less than the particular point award per seat included as the direct musician adjacency subcomponent of the musician adjacency component. The particular point award included as the indirect musician adjacency subcomponent of the musician adjacency component can be, for example, half of a point per musician seat that is indirectly adjacent to the audience seat. In some implementations, the particular point award included as the indirect musician adjacency subcomponent of the musician adjacency component can be, for example, three-quarters of a point per musician seat that is indirectly adjacent to the audience seat. The maximum number of musician seats that can be indirectly adjacent to an audience seat can be, for example, sixteen. FIG. 3 shows a schematic illustration of indirect adjacency locations I relative to direct adjacency locations D and the audience seat A.

Figure 2:
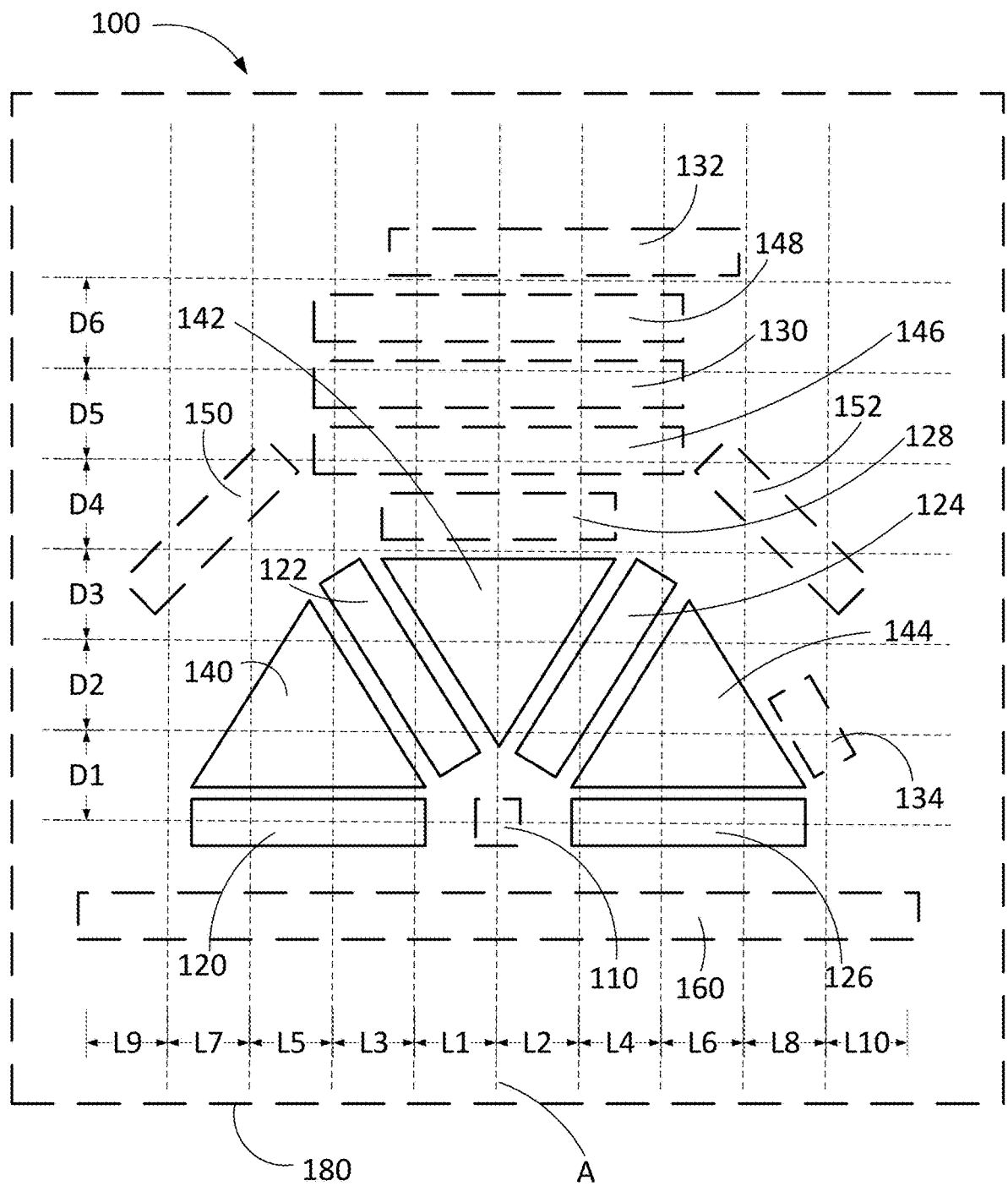
FIG. 2 is a schematic illustration of the assembly of FIG. 1 including a grid showing depth and lateral zones of an event surface, according to an embodiment.

The conductor position depth offset component (CPDOC) of an audience immersion score can include a particular point award based on the distance between the conductor position 110 and the audience seat along the centerline A of the assembly 100 extending through the conductor position 110. For example, FIG. 2 is a schematic illustration of the assembly 180 including a grid showing depth and lateral zones of the event surface 180. As shown, the assembly 100 includes a first depth zone D1, a second depth zone D2, a third depth zone D3, a fourth depth zone D4, a fifth depth zone D5, and a sixth depth zone D6. In some implementations, the conductor position depth offset component is calculated based on the following equation:

CPDOC=Maximum Possible CPDOC−(Depth Impact Factor)*(Number of Depth Zones Between Audience Member and Conductor)

In some implementations, for example, the maximum possible CPDOC can be equal to the number of depth zones of the event surface 180 and the depth impact factor can be 0.5. Thus, 0.5 points can be deducted from the maximum possible CPDOC (e.g., six points) for each depth zone disposed between the audience seat and the conductor position 110. For example, depth zone D4 can have a point award of five points (i.e., six points minus the total of 2 zones times 0.5 points per zone). In some implementations, the assembly 100 can include fewer or more than sixth depth zones. For example, the assembly 100 can include any suitable number of depth zones having any suitable size. In some implementations, the depth zones can be about as wide as a length or width of an audience seat or a musician seat. In some implementations, the depth zones can be about as wide as a length or width of a row of audience seats or a group of audience seats. The maximum possible CPDOC can be, for example, fifteen. In some implementations, depth zones can include portions of the event surface 180 that are on a stage and portions of the event surface 180 that are off-stage. In some implementations, depth zones can include portions of an event surface 180 that are behind a conductor (e.g., the tenth set of audience seats 160). In some implementations, if an audience seat is disposed in more than one depth zone, the audience seat can be assigned the lower depth zone number for the purposes of calculating the CPDOC.

The conductor position lateral offset component (CPLOC) of an audience immersion score can include a particular point award based on a lateral distance between the centerline A of the assembly 100 and the audience seat. For example, FIG. 2 shows the assembly 100 including a number of lateral zones, including a first lateral zone L1, a second lateral zone L2, a third lateral zone L3, a fourth lateral zone L4, a fifth lateral zone L5, a sixth lateral zone L6, a seventh lateral zone L7, an eighth lateral zone L8, a ninth lateral zone L9, and a tenth lateral zone L10. In some implementations, the conductor position lateral offset component is calculated based on the following equation:

CPLOC=Maximum Possible CPLOC−(Lateral Impact Factor)*(Number of Lateral Zones Between Audience Member and Conductor)

In some implementations, for example, the maximum possible CPLOC can be equal to half the number of lateral zones of the event surface 180 and the lateral impact factor can be 0.5. Thus, 0.5 points can be deducted from the maximum possible CPLOC (e.g., five points) for each lateral zone disposed between the audience seat and the conductor position 110. For example, lateral zone L5 can have a point award of 4 (i.e., five points minus the total of 2 zones times 0.5 points per zone). In some implementations, the assembly 100 can include fewer or more than ten lateral zones. For example, the assembly 100 can include any suitable number of lateral zones having any suitable size. In some implementations, the lateral zones can be about as wide as a length or width of an audience seat or a musician seat. In some implementations, the lateral zones can be about as wide as a length or width of a row of audience seats or a group of audience seats. In some implementations, the maximum possible CPLOC can be, for example, five. In some implementations, lateral zones can include portions of the event surface 180 that are on a stage and portions of the event surface 180 that are off-stage. In some implementations, lateral zones can include portions of an event surface 180 that are behind a conductor (e.g., the tenth set of audience seats 160). In some implementations, if an audience seat is disposed in more than one lateral zone, the audience seat can be assigned the lower lateral zone number for the purposes of calculating the CPLOC.

The audience immersion score can be a sum of the musician adjacency component, the conductor position depth offset component, and the conductor position lateral offset component. The musician adjacency component can be a sum of the direct musician adjacency subcomponent and the indirect musician adjacency subcomponent.

In some embodiments, an audience seat can only be placed on an event surface 180 if the audience immersion score assigned to the audience seat is equal to or greater than a threshold minimal acceptable audience immersion score (MAAIS). For example, a threshold MAAIS can be any suitable number, such as, for example, eight, eleven, or fifteen.

In some embodiments, each audience seat can be assigned an overall audience immersion value based on the audience immersion score of the seat falling within a range associated with a particular audience immersion value. The audience immersion values can be, for example, no immersion, slight immersion, basic immersion, and full immersion. For example, an audience immersion score of 0 to 5 can be assigned "no immersion." An audience immersion score of 6 to 10 can be assigned "slight immersion." An audience immersion score of 11 to 15 can be assigned "basic immersion." An audience immersion score of 16 or higher can be assigned "full immersion."

Musician adjacency relative to other musicians (e.g., in an orchestra or ensemble) improves quality of the music making and the cohesiveness of the musicians. Physical adjacencies between the musicians allows for non-verbal, visual communication between musicians and improved aural synergies. Additionally, the ability of each musician to see the conductor is also important for improved quality of music making and cohesiveness of the musicians. In some implementations, a musician seat can only be placed on an event surface 180 if the musician seat is directly adjacent to at least one other musician seat and the musician seat has a direct sight line to the conductor position 110. In some implementations, a musician seat can only be placed on an event surface 180 if the musician seat is directly adjacent to at least one other musician seat and a straight line between the musician seat and the conductor position 110 is unobstructed by an audience seat. In some implementations, a musician seat in the front of an assembly 100 (e.g., the portion of the assembly 100 included in depth zones D1, D2, and D3) can only be placed on an event surface 180 if the musician seat is directly adjacent to at least one other musician seat and a straight line between the musician seat and the conductor position 110 is unobstructed by an audience seat. A musician seat in the back of an assembly 100 (e.g., the portion of the assembly 100 included in depth zones D4, D5, D6, or a farther depth zone), can only be placed on an event surface 180 if the musician seat is directly adjacent to at least one other musician seat and the musician seat faces a direction substantially parallel to the centerline A. In some implementations, a musician seat in the back of the assembly 100 can only be placed on an event surface 180 if the musician seat is directly adjacent to at least one other musician seat and a straight line between the musician seat and the conductor position 110 is obstructed only by alternating single rows of audience seats and musician seats.

In some implementations, an audience immersion score of a particular audience seat can be used to determine a price or monetary value associated with a particular seat. For example, an audience member can be assigned to a particular audience seat based on an audience immersion score assigned to the particular audience seat. For example, a first audience member can be assigned to an audience seat associated with a first score if the audience member has paid a first amount to attend the event, and a second audience member can be assigned to an audience seat associated with a second score if the audience member has paid a second amount to attend the event. The second score and the second amount can be lower than the first score and the first amount, respectively. The audience seats can be grouped in to pricing tiers associated with various prices or monetary amounts, and the assembly 100 can include any suitable number of pricing tiers.

In some implementations, in use, audience members can move between or among distinct audience seats or distinct sets of audience seats (e.g., from a seat in an initial set of audience seats to a seat in a secondary set of audience seats) during an event. For example, an audience member can sit in a first audience seat for a first time period of an event. The audience member can move to sit in a second audience seat for a second time period of an event. The second time period does not overlap the first time period. The first audience seat can be a seat, for example, of one of the first, second, third, or fourth sets of audience seats and the second audience seat can be a seat of another of the first, second, third or fourth sets of audience seats.

In some implementations, an event can begin with an immersion session that lasts an initial duration of time (e.g., 10 minutes). During the immersion session, the audience members can be educated on the instruments of the orchestra and/or introduced to the features of the event. Short selections of music can be played and audience members can be asked to discuss what they visually observed, heard, and felt when listening to the short selections. Following the initial duration of time, a performance can begin. The performance can include a plurality of movements and/or sections. Each movement or section can be performed in its entirety for a duration of time corresponding to the respective movement or section. Following the completion of each movement or section, the audience members can be asked to discuss what they visually observed, heard, and/or felt. Optionally, the audience members can be instructed to move to a different audience seat prior to the beginning of each movement or section. In some implementations, the overall duration of the performance can be one hour or less (e.g., for an adult event) or about thirty minutes (e.g., for a family-focused event). Following the performance, the event can optionally include an instrument zoo in which audience members can interact with musicians and/or instruments (e.g., try to play a violin).

In some implementations, the audience member can be assigned to the first audience seat for the first time period and to the second audience seat for the second time period. An instruction can be provided to the audience member to move from the first audience seat to the second audience seat after the first time period and before the second time period. For example, the audience member can have a ticket identifying the audience member's seat assignment for the first time period and for the second time period. Alternatively or additionally, a written instruction can be located at or near each of the audience seats indicating which audience seat the audience member should move to for the second time period after sitting in the first audience seat for the first time period. Alternatively or additionally, the audience member can receive a verbal instruction (e.g., from the conductor or an usher) indicating the time and/or audience seat to which the audience member should move after the end of the first time period and before the second time period.

Furthermore, the audience member can be assigned any suitable number of audience seats associated with any suitable number of time periods. For example, the audience member can move three, four, or five times during an event, sitting in four, five, or six different audience seats, respectively. In some implementations, for example, the audience member can be assigned a third audience seat for a third time period that is after the second time period and a fourth audience seat for a fourth time period that is after the third time period. Additionally, every audience member attending the event can be assigned different audience seats in any suitable sequence for distinct time periods of an event. For example, the distinct time periods can correspond to different songs, movements, pieces, or any other suitable portions of an event.

In some implementations, each of the audience seat assignments can be based, at least in part, on the type of musician or performer sitting closest to an audience seat and/or to each of a sequence of audience seats. In some implementations, for example, a first audience member can be assigned a first audience seat disposed near a first musician playing a wind instrument (e.g., closer to the first musician than any other musician) for the first time period and a second audience seat disposed near a second musician playing a brass instrument (e.g., closer to the second musician than any other musician) for the second time period. Conversely, a second audience member can be assigned the second audience seat for the first time period and the first audience seat for the second time period. In some implementations, all audience members assigned to an audience seat on a first side of the centerline A for the first time period can be assigned to a second side of the centerline A for the second time period, and vice versa. In some implementations, all audience members assigned to an audience seat in a first zone or series of zones (e.g., zones D1, D2, and D3) for the first time period can be assigned to a second zone or series of zones (e.g., zones D4, D5, and D6) for the second time period, and vice versa. In some implementations, all audience members assigned to an audience seat in a front section of the assembly 100 (e.g., the portion of the assembly 100 closest to the conductor position 110 including sets of radially-arranged musicians) for the first time period can be assigned to a back section of the assembly 100 (e.g., the portion of the assembly 100 behind the front section and including sets of musicians including rows extending perpendicularly to the centerline A1) for the second time period, and vice versa.

In some implementations, each of the audience seat assignments can be based, at least in part, on the audience immersion score of an audience seat and/or a sequence of audience seats. In some implementations, for example, a first audience member can be assigned a first audience seat having a first audience immersion score for the first time period and a second audience seat having a second audience immersion score for the second time period. The first audience immersion score can be lower than the second audience immersion score. Conversely, a second audience member can be assigned the second audience seat for the first time period and the first audience seat for the second time period. In some implementations, each audience member can be assigned a particular sequence of audience seats (e.g., one per time period of the event) such that an average audience immersion score of the audience immersion scores of each audience seat in the sequence is above a threshold average audience immersion score.

In some implementations, rather than assigning each audience member to a specific audience seat or specific sequence of audience seats, each audience member can be assigned to a group (also referred to as a "pod"). Each group can be assigned to an initial set of audience seats for a first time period and to a secondary set of audience seats for a second time period. Thus, each audience member of a specific group can select their own audience seat from the assigned set of audience seats on a first-come-first-serve basis. Rather than instructing an audience member to first sit in a first specific audience seat and a second specific audience seat, the audience member can be instructed to sit in an audience seat from a first set of audience seats and an audience seat from a second set of audience seats.

In some implementations, the number of groups of audience members can correspond to the number of sets of audience seats. In some implementations, the number of groups of audience members can correspond to the number of sets of audience seats minus the sets of audience seats designated as waiting or holding sets. For example, a first group of audience members can be assigned to an initial set of audience seats (e.g., the first set of audience seats 140) for a first time period and to a secondary set of audience seats (e.g., the third set of audience seats 144) for a second time period. A second group of audience members can be assigned to the secondary set of audience seats for the first time period and to the initial set of audience seats for the second time period. At the end of the first time period and before the start of the second time period, the first group can be assigned to wait in a holding or waiting area (e.g., the tenth set of audience seats 160) for a third time period while the second group moves from the secondary set of audience seats to the initial set of audience seats. The third time period can be after the first time period and before the second time period. After the second group is seated in the first set of audience seats, the first group can move to the second set of audience seats.

The groups of audience members can be assigned to any suitable number of sets of audience seats associated with any suitable number of time periods. For example, a group can move three, four, or five times during an event, with each member sitting in four, five, or six different audience seats, respectively. In some implementations, for example, the group can be assigned to a third set of audience seats for a fourth time period which is after the second time period and a fourth set of audience seats for a fifth time period which is after the fourth time period. Additionally, every group of audience members can be assigned different sets of audience seats in any suitable sequence for distinct time periods of an event. For example, the distinct time periods can correspond to different songs, movements, pieces, or any other suitable portions of an event. Additionally, audience members can request to be assigned to the same group (e.g., family members and/or friends attending the event together).

Figure 4:
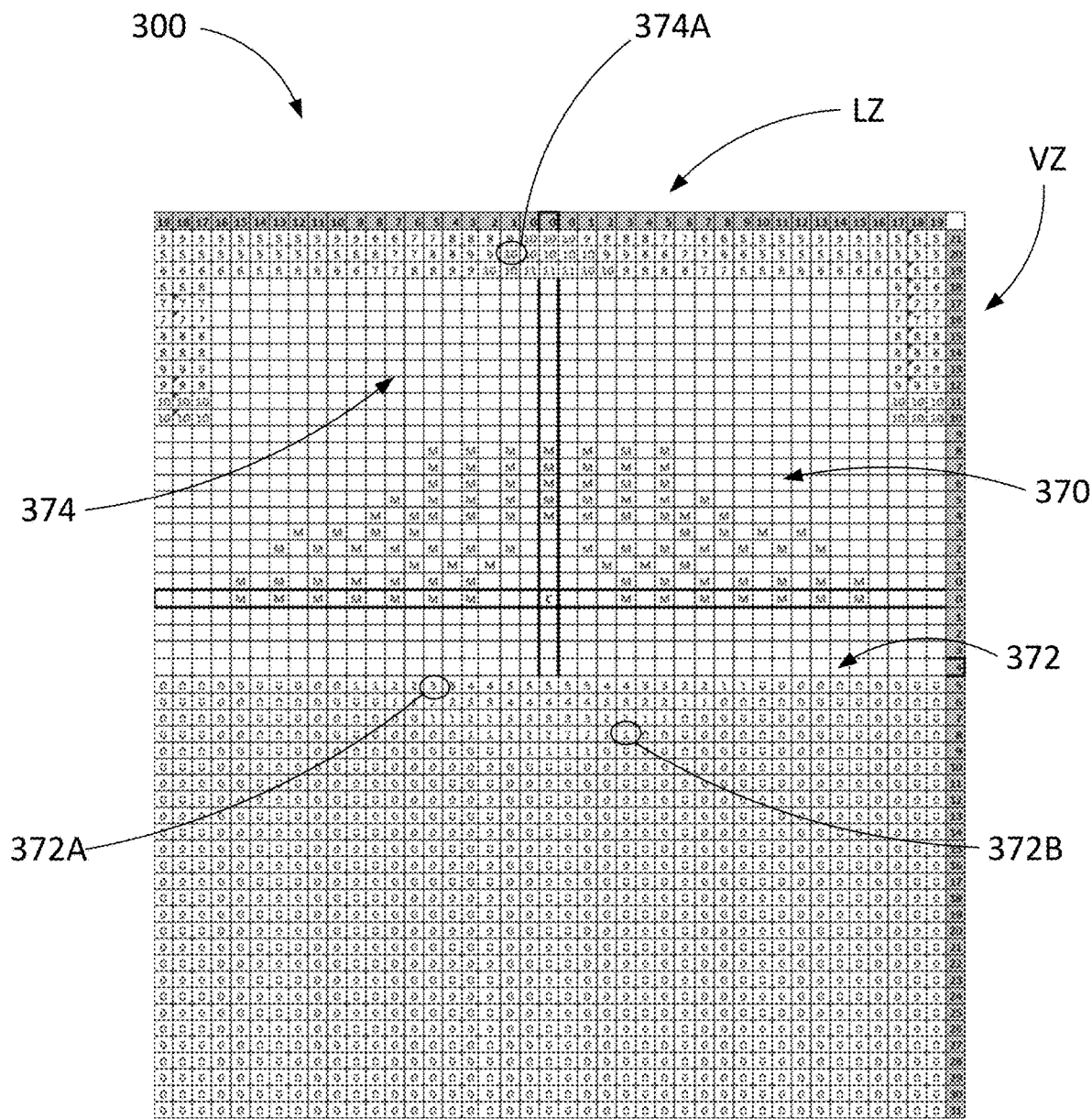
FIG. 4 is a schematic illustration of an assembly of musician seats and audience seats arranged in a traditional orchestra and audience arrangement, according to an embodiment.

FIG. 4 is a schematic example of an assembly 300 of musician seats and audience seats arranged in a known orchestra and audience arrangement, according to an embodiment. For example, the musician seats are arranged as a known orchestra 370, with each musician seat represented by an "M". The audience seats include a first set of audience seats 372 and a second set of audience seats 374. The first set of audience seats 372 includes a plurality of rows of audience seats in a known audience concert hall arrangement. The second set of audience seats 374 includes a plurality of audience seats in an "in the round" arrangement. Each audience seat is represented by an audience immersion score in a cell. Lateral zones LZ are identified and labeled along the upper horizontal axis and vertical zones VZ are identified and labeled along the side vertical axis.

As shown in FIG. 4, the audience immersion scores of the first set of audience seats 372 and the second set of audience seats 374 are all lower than 11, with many of the audience immersion scores being 0 due to the audience seat having no direct or indirect musician adjacency and being too far from the conductor with respect to the number of lateral zones and depth zones to include any points associated with a conductor position depth offset component or a conductor position lateral offset component.

For the purpose of calculating the audience immersion scores of each audience seat of the first set of audience seats 372, the maximum possible CPDOC is 5 and the depth impact factor is 1. The maximum possible CPLOC is 5 and the lateral impact factor is 0.5. For the purpose of calculating the audience immersion scores of each audience seat of the second set of audience seats 374, the maximum possible CPDOC is 15 and the depth impact factor is 0.5. The maximum possible CPLOC is 5 and the lateral impact factor is 0.5. For both the first set of audience seats 372 and the second set of audience seats 374, the direct musician adjacency subcomponent can be calculated by multiplying 1 by the number of musicians directly adjacent to an audience seat (e.g., in a cell directly adjacent to the audience seat cell). The indirect musician adjacency subcomponent can be calculated by multiplying 0.5 by the number of musicians indirectly adjacent to an audience seat (e.g., in a cell directly adjacent to a cell that is directly adjacent to the audience seat cell).

For example, audience seat 372A has been assigned an audience immersion score of 3. The audience seat 372A is not directly or indirectly adjacent to any musicians M, so the audience immersion score includes no points for musician adjacency. The audience seat 372A is disposed in lateral zone five and depth zone five. Thus, the CPLOC of the audience immersion score can be calculated by multiplying the lateral offset (0.5) by the lateral zone (5) and subtracting the subtotal from the maximum possible CPLOC (5), resulting in a CPLOC of 2.5. The CPDOC of the audience immersion score can be calculated by multiplying the depth offset (1) by the depth zone (5) and subtracting the subtotal from the maximum possible CPDOC (5), resulting in a CPDOC of 0. The sum of the musician adjacency component, the CPLOC, and the CPDOC (e.g., 0+2.5+0) equals 2.5. This score is rounded up to the nearest whole number, resulting in an audience immersion score of 3.

As another example, audience seat 372B has been assigned an audience immersion score of 1. The audience seat 372B is not directly or indirectly adjacent to any musicians M, so the audience immersion score includes no points for musician adjacency. The audience seat 372B is disposed in lateral zone four and depth zone eight. Thus, the CPLOC of the audience immersion score can be calculated by multiplying the lateral offset (0.5) by the lateral zone (3) and subtracting the subtotal from the maximum possible CPLOC (5), resulting in a CPLOC of 3.5. The CPDOC of the audience immersion score can be calculated by multiplying the depth offset (1) by the depth zone (8) and subtracting the subtotal from the maximum possible CPDOC (5), resulting in a CPDOC of −3. The sum of the musician adjacency component, the CPLOC, and the CPDOC (e.g., 0+3.5-3) equals 0.5. This score is rounded up to the nearest whole number, resulting in an audience immersion score of 1.

As another example, audience seat 374A has been assigned an audience immersion score of 10. The audience seat 374A is not directly or indirectly adjacent to any musicians M, so the audience immersion score includes no points for musician adjacency. The audience seat 374A is disposed in lateral zone one and depth zone twenty. Thus, the CPLOC of the audience immersion score can be calculated by multiplying the lateral offset (0.5) by the lateral zone (1) and subtracting the subtotal from the maximum possible CPLOC (5), resulting in a CPLOC of 4.5. The CPDOC of the audience immersion score can be calculated by multiplying the depth offset (0.5) by the depth zone (20) and subtracting the subtotal from the maximum possible CPDOC (15), resulting in a CPDOC of 5. The sum of the musician adjacency component, the CPLOC, and the CPDOC (e.g., 0+4.5+5) equals 9.5. This score is rounded up to the nearest whole number, resulting in an audience immersion score of 10.

The total number of audience seats included in the first set of audience seats 372 of the assembly 300 is 1107. The average audience immersion score of the first set of audience seats 372 is 0.13. The maximum audience immersion score the first set of audience seats 372 is 5 and the minimum audience immersion score the first set of audience seats 372 is 0. Therefore, only a triangular section in the first five rows of the first set of audience seats 372 has any immersion impact at all. A score in the 0 to 5 range, however, can be assigned a value of "no immersion."

The total number of audience seats included in the second set of audience seats 374 of the assembly 300 is 218. The average audience immersion score of the second set of audience seats 374 is 6.93. The maximum audience immersion score the second set of audience seats 374 is 10.5 and the minimum audience immersion score the first set of audience seats 374 is 5. Thus, while many of the audience seats of the second set of audience seats 374 have higher audience immersion scores than many of the audience seats of the first set of audience seats 372, none of the audience seats of the second set of audience seats 374 are above 11, and thus can only be assigned values of "no immersion" (e.g., for scores 0-5) and "slight immersion" (e.g., for scores 6-10).

Figure 5:
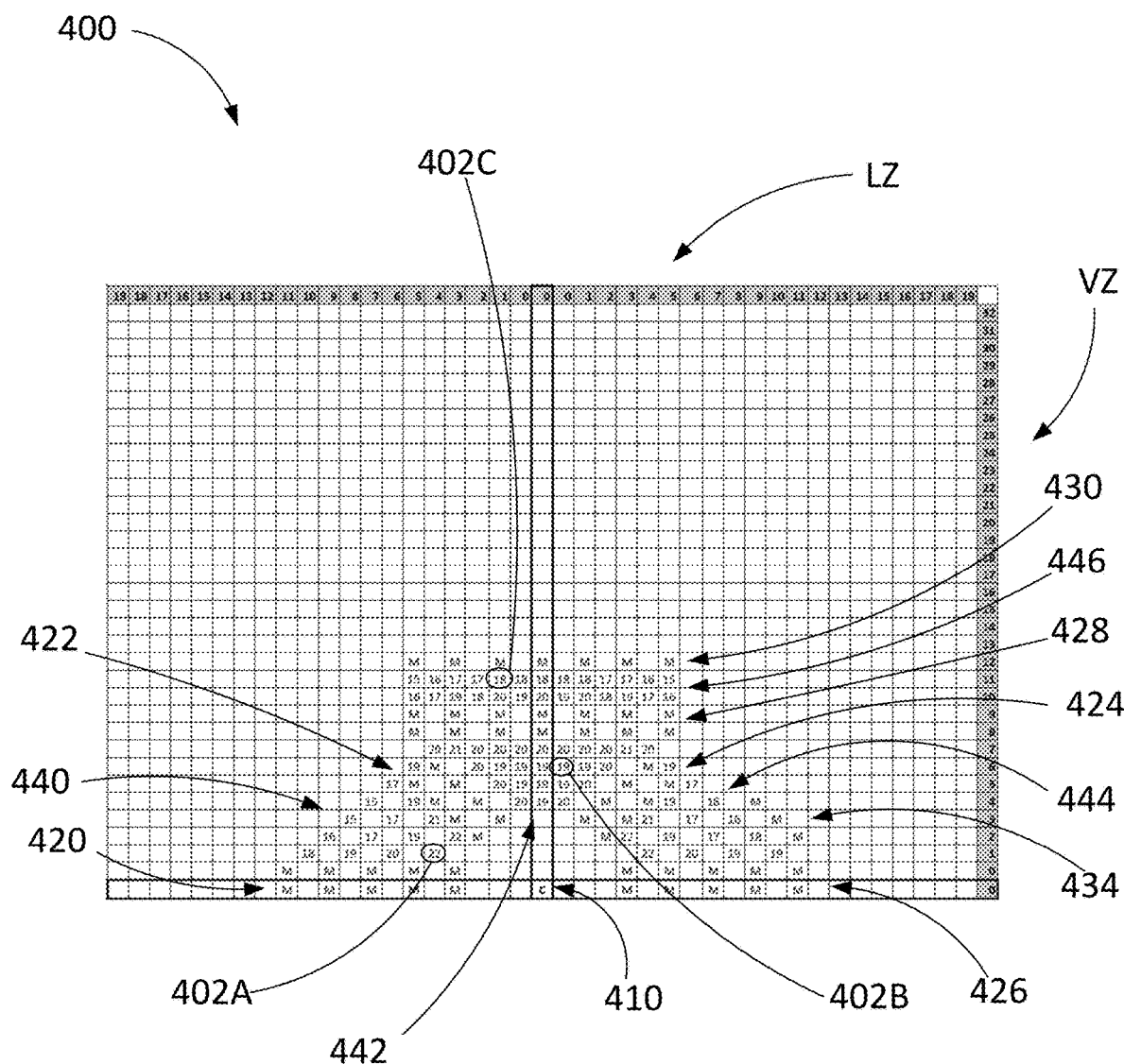
FIG. 5 is a schematic example of an assembly of musician seats and audience seats arranged such that the audience seats are disposed within a medium-sized orchestra arrangement, according to an embodiment.

In some implementations, audience seats can be embedded within an orchestra setup to improve the audience immersion score of each audience seat compared to a known audience set up and/or an in-the-round audience set up shown in FIG. 4. For example, FIG. 5 is a schematic example of an assembly 400 of musician seats and audience seats arranged such that the audience seats are disposed within a medium-sized orchestra arrangement, according to an embodiment. The assembly 400 can be used, for example, for performances of works by Beethoven and/or Brahms. Each musician seat is represented by an "M". Each audience seat is represented by an audience immersion score in a cell. Lateral zones LZ are identified and labeled along the upper horizontal axis and vertical zones VZ are identified and labeled along the side vertical axis.

The assembly 400 can be the same or similar in structure and/or function to any of the assemblies described herein, such as, for example, the assembly 100. For example, the assembly 400 includes multiple sets of musician seats and multiple sets of audience seats. The multiple sets of musician seats includes a first set of musician seats 420, a second set of musician seats 422, a third set of musician seats 424, and a fourth set of musician seats 426. Each of the first set of musician seats 420, the second set of musician seats 422, the third set of musician seats 424, and the fourth set of musician seats 426 include two lines of musician seats extending radially away from a conductor position 410. The plurality of audience seats includes a first set of audience seats 440, a second set of audience seats 442, and a third set of audience seats 444. The first set of audience seats 440 is disposed between the first set of musician seats 420 and the second set of musician seats 422. The second set of audience seats 442 is disposed between the second set of musician seats 422 and the third set of musician seats 424. The third set of audience seats 444 is disposed between the third set of musician seats 424 and the fourth set of musician seats 426. Each of the first set of audience seats 440, the second set of audience seats 442, and the third set of audience seats 444 includes a plurality of rows of audience seats and has a profile (e.g., overall shape of the arrangement of the set) that is tapered toward the conductor position 410 such that each of the first set of audience seats 440, the second set of audience seats 442, and the third set of audience seats 444 includes rows with fewer seats disposed closer to the conductor position 410 compared to rows with higher numbers of seats. The assembly 400 also includes a fifth set of musician seats 428 including two rows of musician seats, a fourth set of audience seats 446 including two rows of audience seats, a sixth set of musician seats 430, and a seventh set of musician seats 434. The first set of audience seats 440, the second set of audience seats 442, and the third set of audience seats 444 can be part of a front set of audience seats. The fourth set of audience seats 446 can be part of a back set of audience seats.

As shown in FIG. 5, the audience immersion scores of the audience seats of the assembly 400 are all above 15. For the purpose of calculating the audience immersion scores of each audience seat of the assembly 400, the maximum possible CPDOC is 15 and the depth impact factor is 0.5. The maximum possible CPLOC is 5 and the lateral impact factor is 0.5. The direct musician adjacency subcomponent can be calculated by multiplying a factor of 1 by the number of musicians directly adjacent to an audience seat (e.g., in a cell directly adjacent to the audience seat cell). The indirect musician adjacency subcomponent can be calculated by multiplying a factor of 0.5 by the number of musicians indirectly adjacent to an audience seat (e.g., in a cell directly adjacent to a cell that is directly adjacent to the audience seat cell).

For example, audience seat 402A has been assigned an audience immersion score of 22. The audience seat 402A is directly adjacent to two musicians M, so the direct musician adjacency subcomponent is 2 (e.g., a product of 1*2 musicians). The audience seat 402A is indirectly adjacent to four musicians M, so the indirect musician adjacency subcomponent is 2 (e.g., a product of 0.5*4 musicians). Therefore, the musician adjacency component of the audience immersion score for audience seat 402A is 4 (e.g., 2+2). The audience seat 402A is disposed in lateral zone four and depth zone one. Thus, the CPLOC of the audience immersion score can be calculated by multiplying the lateral offset (0.5) by the lateral zone (4) and subtracting the subtotal from the maximum possible CPLOC (5), resulting in a CPLOC of 3. The CPDOC of the audience immersion score can be calculated by multiplying the depth offset (0.5) by the depth zone (1) and subtracting the subtotal from the maximum possible CPDOC (15), resulting in a CPDOC of 14.5. The sum of the musician adjacency component, the CPLOC, and the CPDOC (e.g., 4+3+14.5) equals 21.5. This score is rounded to the nearest whole number, resulting in an audience immersion score of 22.

As another example, audience seat 402B has been assigned an audience immersion score of 19. The audience seat 402B is directly adjacent to zero musicians M, so the direct musician adjacency subcomponent is 0 (e.g., a product of 1*0 musicians). The audience seat 402B is indirectly adjacent to three musicians M, so the indirect musician adjacency subcomponent is 1.5 (e.g., a product of 0.5*3 musicians). Therefore, the musician adjacency component of the audience immersion score for audience seat 402B is 1.5 (e.g., 0+1.5). The audience seat 402B is disposed in lateral zone zero and depth zone six. Thus, the CPLOC of the audience immersion score can be calculated by multiplying the lateral offset (0.5) by the lateral zone (0) and subtracting the subtotal from the maximum possible CPLOC (5), resulting in a CPLOC of 5. The CPDOC of the audience immersion score can be calculated by multiplying the depth offset (0.5) by the depth zone (6) and subtracting the subtotal from the maximum possible CPDOC (15), resulting in a CPDOC of 12. The sum of the musician adjacency component, the CPLOC, and the CPDOC (e.g., 1.5+5+12) equals 18.5. This score is rounded to the nearest whole number, resulting in an audience immersion score of 19.

As another example, audience seat 402C has been assigned an audience immersion score of 18. The audience seat 402C is directly adjacent to one musician M, so the direct musician adjacency subcomponent is 1 (e.g., a product of 1*1 musician). The audience seat 402C is indirectly adjacent to five musicians M, so the indirect musician adjacency subcomponent is 2.5 (e.g., a product of 0.5*5 musicians). Therefore, the musician adjacency component of the audience immersion score for audience seat 402C is 3.5 (e.g., 1+2.5). The audience seat 402C is disposed in lateral zone one and depth zone eleven. Thus, the CPLOC of the audience immersion score can be calculated by multiplying the lateral offset (0.5) by the lateral zone (1) and subtracting the subtotal from the maximum possible CPLOC (5), resulting in a CPLOC of 4.5. The CPDOC of the audience immersion score can be calculated by multiplying the depth offset (0.5) by the depth zone (11) and subtracting the subtotal from the maximum possible CPDOC (15), resulting in a CPDOC of 9.5. The sum of the musician adjacency component, the CPLOC, and the CPDOC (e.g., 3.5+4.5+9.5) equals 17.5. This score is rounded up to the nearest whole number, resulting in an audience immersion score of 18.

The total number of audience seats included in the assembly 400 is eighty-two. The total number of musician seats included in the assembly 400 is sixty. Thus, the ratio of the number of audience seats to musician seats is 1.4. The average audience immersion score of the audience seats is 18, with the maximum audience immersion score being 22 and the minimum audience immersion score being 15.

The total number of audience seats included in the front section of the assembly 400 is fifty-six. The total number of musician seats included in the front section of the assembly 400 is thirty-nine. Thus, the ratio of the number of audience seats to musician seats in the front section is 1.4. The average audience immersion score of the audience seats in the front section is 19, with the maximum audience immersion score being 22 and the minimum audience immersion score being 15.

The total number of audience seats included in the back section of the assembly 400 is twenty-six. The total number of musician seats included in the back section of the assembly 400 is twenty-one. Thus, the ratio of the number of audience seats to musician seats in the back section is 1.2. The average audience immersion score of the audience seats in the back section is 17, with the maximum audience immersion score being 20 and the minimum audience immersion score being 15.

Therefore, all of the audience seats in the assembly 400 can be assigned values of "basic immersion" (e.g., an audience immersion score between 11 and 15) or "full immersion" (e.g., an audience immersion score of 16 of higher).

Figure 6:
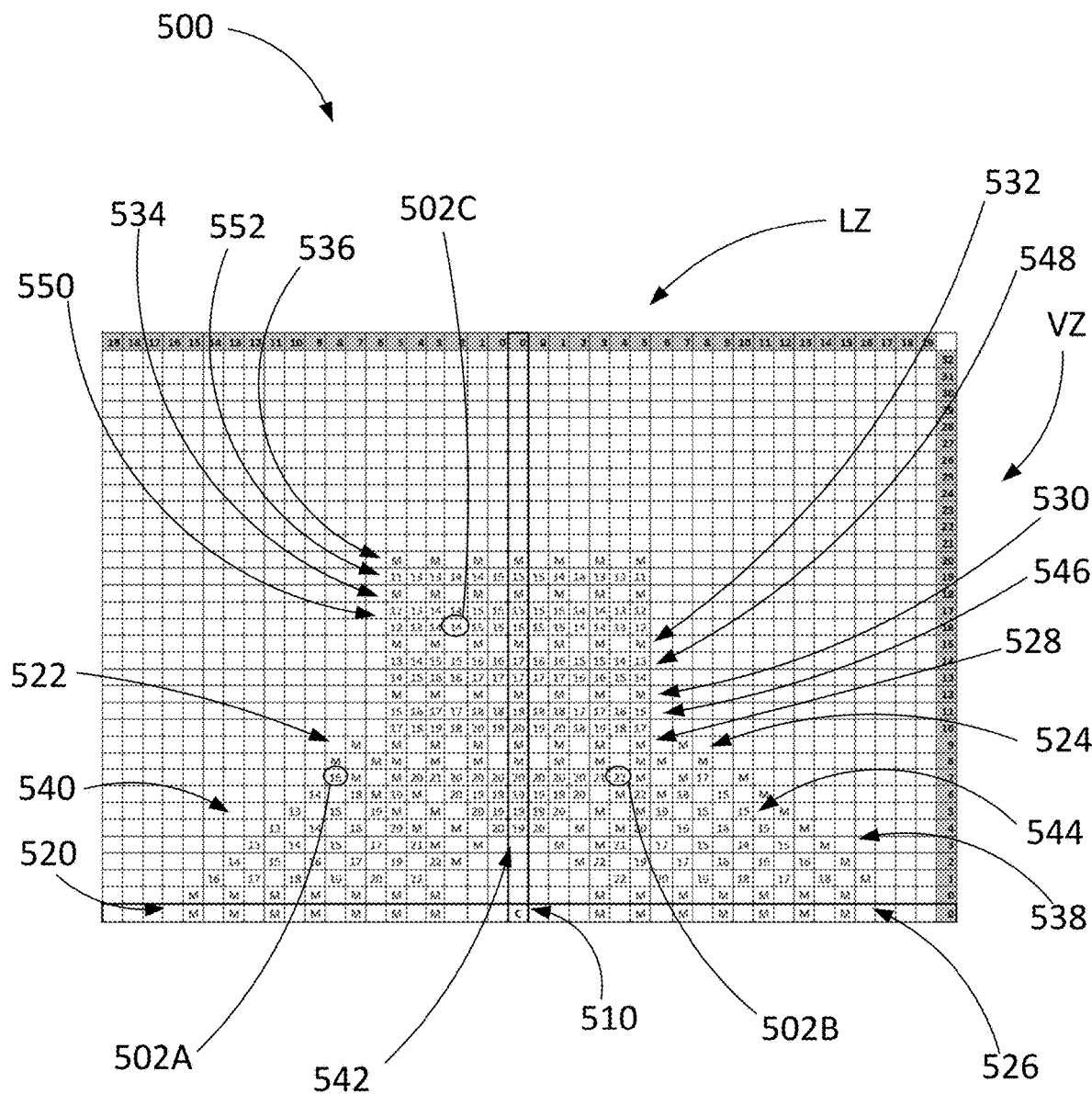
FIG. 6 is a schematic example of an assembly of musician seats and audience seats arranged such that the audience seats are disposed within a large-sized orchestra arrangement, according to an embodiment.

FIG. 6 is a schematic example of an assembly 500 of musician seats and audience seats arranged such that the audience seats are disposed within a large-sized orchestra arrangement, according to an embodiment. The assembly 500 can be used, for example, for performances of works by Mahler and/or Holst. Each musician seat is represented by an "M". Each audience seat is represented by an audience immersion score in a cell. Lateral zones LZ are identified and labeled along the upper horizontal axis and vertical zones VZ are identified and labeled along the side vertical axis.

The assembly 500 can be the same or similar in structure and/or function to any of the assemblies described herein, such as, for example, the assembly 100. For example, the assembly 500 includes multiple sets of musician seats and multiple sets of audience seats. The multiple sets of musician seats includes a first set of musician seats 520, a second set of musician seats 522, a third set of musician seats 524, and a fourth set of musician seats 526. Each of the first set of musician seats 520, the second set of musician seats 522, the third set of musician seats 524, and the fourth set of musician seats 526 include two lines of musician seats extending radially away from a conductor position 510. The plurality of audience seats includes a first set of audience seats 540, a second set of audience seats 542, and a third set of audience seats 544. The first set of audience seats 540 is disposed between the first set of musician seats 520 and the second set of musician seats 522. The second set of audience seats 542 is disposed between the second set of musician seats 522 and the third set of musician seats 524. The third set of audience seats 544 is disposed between the third set of musician seats 524 and the fourth set of musician seats 526. Each of the first set of audience seats 540, the second set of audience seats 542, and the third set of audience seats 544 includes a plurality of rows of audience seats and has a profile (e.g., overall shape of the arrangement of the set) that is tapered toward the conductor position 510 such that each of the first set of audience seats 540, the second set of audience seats 542, and the third set of audience seats 544 includes rows with fewer seats disposed closer to the conductor position 510 compared to rows with higher numbers of seats. The assembly 500 also includes a fifth set of musician seats 528 including two rows of musician seats, a fourth set of audience seats 546 including two rows of audience seats, a sixth set of musician seats 530, a fifth set of audience seats 548 including two rows of audience seats, a seventh set of musician seats 532, a sixth set of audience seats 550 including two rows of audience seats, an eighth set of musician seats 534, a seventh set of audience seats 552 including one row of audience seats, a ninth set of musician seats 536, and a tenth set of musician seats 538. The first set of audience seats 540, the second set of audience seats 542, and the third set of audience seats 544 can be part of a front set of audience seats. The fourth set of audience seats 546, the fifth set of audience seats 548, a sixth set of audience seats 550, and a seventh set of audience seats 552 can be part of a back set of audience seats.

As shown in FIG. 6, the audience immersion scores of the audience seats of the assembly 500 are all above 11. For the purpose of calculating the audience immersion scores of each audience seat of the assembly 500, the maximum possible CPDOC is 15 and the depth impact factor is 0.5. The maximum possible CPLOC is 5 and the lateral impact factor is 0.5. The direct musician adjacency subcomponent can be calculated by multiplying a factor of 1 by the number of musicians directly adjacent to an audience seat (e.g., in a cell directly adjacent to the audience seat cell). The indirect musician adjacency subcomponent can be calculated by multiplying a factor of 0.5 by the number of musicians indirectly adjacent to an audience seat (e.g., in a cell directly adjacent to a cell that is directly adjacent to the audience seat cell).

For example, audience seat 502A has been assigned an audience immersion score of 16. The audience seat 502A is directly adjacent to two musicians M, so the direct musician adjacency subcomponent is 2 (e.g., a product of 1*2 musicians). The audience seat 502A is indirectly adjacent to three musicians M, so the indirect musician adjacency subcomponent is 1.5 (e.g., a product of 0.5*3 musicians). Therefore, the musician adjacency component of the audience immersion score for audience seat 502A is 3.5 (e.g., 2+1.5). The audience seat 502A is disposed in lateral zone eight and depth zone seven. Thus, the CPLOC of the audience immersion score can be calculated by multiplying the lateral offset (0.5) by the lateral zone (8) and subtracting the subtotal from the maximum possible CPLOC (5), resulting in a CPLOC of 1. The CPDOC of the audience immersion score can be calculated by multiplying the depth offset (0.5) by the depth zone (7) and subtracting the subtotal from the maximum possible CPDOC (15), resulting in a CPDOC of 11.5. The sum of the musician adjacency component, the CPLOC, and the CPDOC (e.g., 3.5+1+11.5) equals 16. Thus, the audience immersion score of the audience seat 502A is 16.

As another example, audience seat 502B has been assigned an audience immersion score of 22. The audience seat 502B is directly adjacent to four musicians M, so the direct musician adjacency subcomponent is 4 (e.g., a product of 1*4 musicians). The audience seat 502B is indirectly adjacent to six musicians M, so the indirect musician adjacency subcomponent is 3 (e.g., a product of 0.5*6 musicians). Therefore, the musician adjacency component of the audience immersion score for audience seat 502B is 7 (e.g., 4+3). The audience seat 502B is disposed in lateral zone four and depth zone seven. Thus, the CPLOC of the audience immersion score can be calculated by multiplying the lateral offset (0.5) by the lateral zone (4) and subtracting the subtotal from the maximum possible CPLOC (5), resulting in a CPLOC of 3. The CPDOC of the audience immersion score can be calculated by multiplying the depth offset (0.5) by the depth zone (7) and subtracting the subtotal from the maximum possible CPDOC (15), resulting in a CPDOC of 11.5. The sum of the musician adjacency component, the CPLOC, and the CPDOC (e.g., 7+3+11.5) equals 21.5. This score is rounded to the nearest whole number, resulting in an audience immersion score of 22.

As another example, audience seat 502C has been assigned an audience immersion score of 14. The audience seat 502C is directly adjacent to two musicians M, so the direct musician adjacency subcomponent is 2 (e.g., a product of 1*2 musicians). The audience seat 502C is indirectly adjacent to two musicians M, so the indirect musician adjacency subcomponent is 1 (e.g., a product of 0.5*2 musicians). Therefore, the musician adjacency component of the audience immersion score for audience seat 502C is 3 (e.g., 2+1). The audience seat 502C is disposed in lateral zone two and depth zone sixteen. Thus, the CPLOC of the audience immersion score can be calculated by multiplying the lateral offset (0.5) by the lateral zone (2) and subtracting the subtotal from the maximum possible CPLOC (5), resulting in a CPLOC of 4. The CPDOC of the audience immersion score can be calculated by multiplying the depth offset (0.5) by the depth zone (16) and subtracting the subtotal from the maximum possible CPDOC (15), resulting in a CPDOC of 7. The sum of the musician adjacency component, the CPLOC, and the CPDOC (e.g., 3+4+7) equals 14. Thus, the audience immersion score of the audience seat 502A is 14.

The total number of audience seats included in the assembly 500 is 173. The total number of musician seats included in the assembly 500 is 105. Thus, the ratio of the number of audience seats to musician seats is 1.6. The average audience immersion score of the audience seats is 16, with the maximum audience immersion score being 22 and the minimum audience immersion score being 11.

The total number of audience seats included in the front section of the assembly 500 is eighty-two. The total number of musician seats included in the front section of the assembly 500 is fifty-seven. Thus, the ratio of the number of audience seats to musician seats in the front section is 1.4. The average audience immersion score of the audience seats in the front section is 18, with the maximum audience immersion score being 22 and the minimum audience immersion score being 13.

The total number of audience seats included in the back section of the assembly 500 is ninety-one. The total number of musician seats included in the back section of the assembly 500 is forty-eight. Thus, the ratio of the number of audience seats to musician seats in the back section is 1.9. The average audience immersion score of the audience seats in the back section is 15, with the maximum audience immersion score being 20 and the minimum audience immersion score being 11.

Therefore, all of the audience seats in the assembly 500 can be assigned values of "basic immersion" (e.g., an audience immersion score between 11 and 15) or "full immersion" (e.g., an audience immersion score of 16 of higher). Additionally, as shown by the scores in the seventh set of audience seats 552, to account for the deduction in the CPDOC of the audience seats in that section due to be farther from the conductor position 510 compared to other audience seats, fewer rows of audience seats can be placed between musician rows in the rear of the back section.

Figure 7:
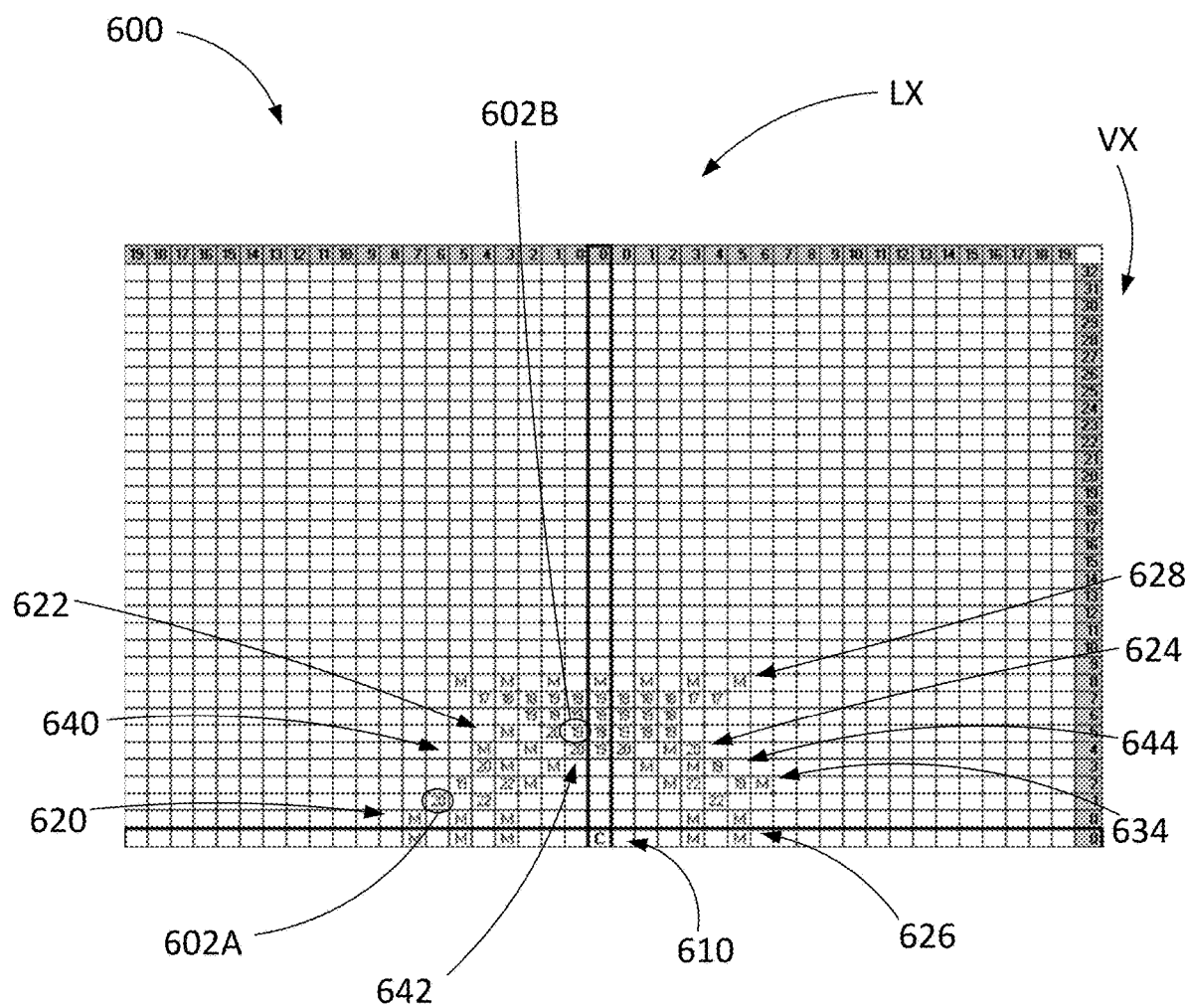
FIG. 7 is a schematic example of an assembly of musician seats and audience seats arranged such that the audience seats are disposed within a small-sized orchestra arrangement, according to an embodiment.

FIG. 7 is a schematic example of an assembly 600 of musician seats and audience seats arranged such that the audience seats are disposed within a small-sized orchestra arrangement, according to an embodiment. The assembly 600 can be used, for example, for performances of works by Bach and/or Mozart. Each musician seat is represented by an "M". Each audience seat is represented by an audience immersion score in a cell. Lateral zones LZ are identified and labeled along the upper horizontal axis and vertical zones VZ are identified and labeled along the side vertical axis.

The assembly 600 can be the same or similar in structure and/or function to any of the assemblies described herein, such as, for example, the assembly 100. For example, the assembly 600 includes multiple sets of musician seats and multiple sets of audience seats. The multiple sets of musician seats includes a first set of musician seats 620, a second set of musician seats 622, a third set of musician seats 624, and a fourth set of musician seats 626. Each of the first set of musician seats 620, the second set of musician seats 622, the third set of musician seats 624, and the fourth set of musician seats 626 include two lines of musician seats extending radially away from a conductor position 610. The plurality of audience seats includes a first set of audience seats 640, a second set of audience seats 642, and a third set of audience seats 644. The first set of audience seats 640 is disposed between the first set of musician seats 620 and the second set of musician seats 622. The second set of audience seats 642 is disposed between the second set of musician seats 622 and the third set of musician seats 624. The third set of audience seats 644 is disposed between the third set of musician seats 624 and the fourth set of musician seats 626. Each of the first set of audience seats 640, the second set of audience seats 642, and the third set of audience seats 644 includes a plurality of rows of audience seats. The assembly 600 also includes a fifth set of musician seats 628 including a row of musician seats disposed behind the second set of audience seats 642, and a sixth set of musician seats 634 including a single musician M disposed behind the third set of musician seats 624.

As shown in FIG. 7, the audience immersion scores of the audience seats of the assembly 600 are all above 19. For the purpose of calculating the audience immersion scores of each audience seat of the assembly 600, the maximum possible CPDOC is 15 and the depth impact factor is 0.5. The maximum possible CPLOC is 5 and the lateral impact factor is 0.5. The direct musician adjacency subcomponent can be calculated by multiplying a factor of 1 by the number of musicians directly adjacent to an audience seat (e.g., in a cell directly adjacent to the audience seat cell). The indirect musician adjacency subcomponent can be calculated by multiplying a factor of 0.5 by the number of musicians indirectly adjacent to an audience seat (e.g., in a cell directly adjacent to a cell that is directly adjacent to the audience seat cell).

For example, audience seat 602A has been assigned an audience immersion score of 20. The audience seat 602A is directly adjacent to two musicians M, so the direct musician adjacency subcomponent is 2 (e.g., a product of 1*2 musicians). The audience seat 602A is indirectly adjacent to two musicians M, so the indirect musician adjacency subcomponent is 1 (e.g., a product of 0.5*2 musicians). Therefore, the musician adjacency component of the audience immersion score for audience seat 602A is 3 (e.g., 2+1). The audience seat 602A is disposed in lateral zone six and depth zone one. Thus, the CPLOC of the audience immersion score can be calculated by multiplying the lateral offset (0.5) by the lateral zone (6) and subtracting the subtotal from the maximum possible CPLOC (5), resulting in a CPLOC of 2. The CPDOC of the audience immersion score can be calculated by multiplying the depth offset (0.5) by the depth zone (1) and subtracting the subtotal from the maximum possible CPDOC (15), resulting in a CPDOC of 14.5. The sum of the musician adjacency component, the CPLOC, and the CPDOC (e.g., 3+2+14.5) equals 19.5. This score is rounded to the nearest whole number, resulting in an audience immersion score of 20.

As another example, audience seat 602B has been assigned an audience immersion score of 19. The audience seat 602B is directly adjacent to zero musicians M, so the direct musician adjacency subcomponent is 0 (e.g., a product of 1*0 musicians). The audience seat 602B is indirectly adjacent to two musicians M, so the indirect musician adjacency subcomponent is 1 (e.g., a product of 0.5*2 musicians). Therefore, the musician adjacency component of the audience immersion score for audience seat 602B is 1 (e.g., 0+1). The audience seat 602B is disposed in lateral zone zero and depth zone five. Thus, the CPLOC of the audience immersion score can be calculated by multiplying the lateral offset (0.5) by the lateral zone (0) and subtracting the subtotal from the maximum possible CPLOC (5), resulting in a CPLOC of 5. The CPDOC of the audience immersion score can be calculated by multiplying the depth offset (0.5) by the depth zone (5) and subtracting the subtotal from the maximum possible CPDOC (15), resulting in a CPDOC of 12.5. The sum of the musician adjacency component, the CPLOC, and the CPDOC (e.g., 1+5+12.5) equals 18.5. This score is rounded to the nearest whole number, resulting in an audience immersion score of 19.

The total number of audience seats included in the assembly 600 is 37. The total number of musician seats included in the assembly 600 is 28. Thus, the ratio of the number of audience seats to musician seats is 1.3. The average audience immersion score of the audience seats is 18.9, with the maximum audience immersion score being 22 and the minimum audience immersion score being 16.5. Therefore, all of the audience seats in the assembly 600 can be assigned values of "full immersion" (e.g., an audience immersion score of 16 of higher).

Figure 8:
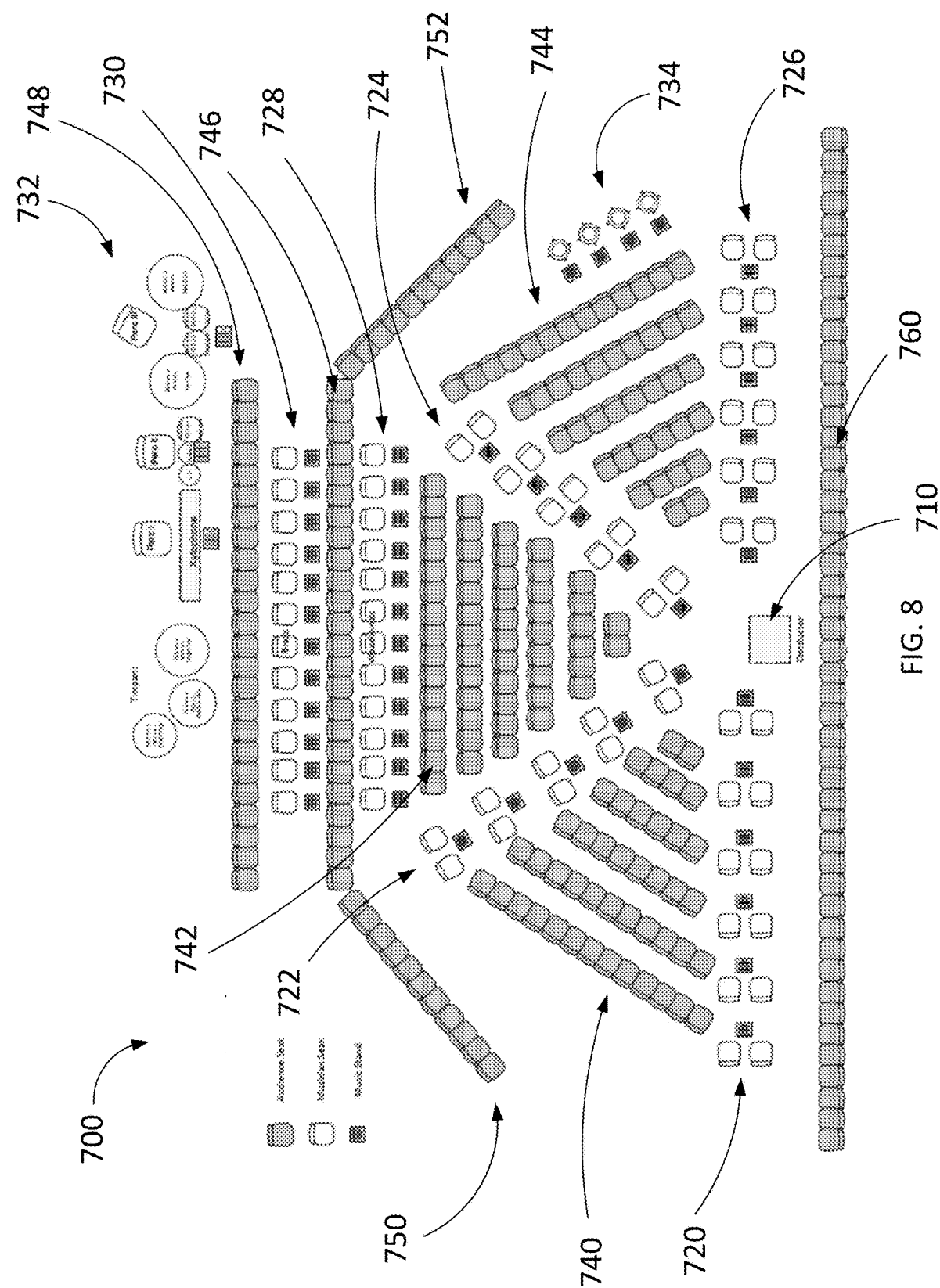
FIG. 8 is a schematic illustration of an assembly of audience member seats and musician seats, according to an embodiment.

FIG. 8 is a schematic example of an assembly 700 of musician seats and audience seats arranged such that the audience seats are disposed within an orchestra arrangement, according to an embodiment. Each musician seat is represented by an unshaded (e.g., white) chair icon. Each audience seat is represented by an shaded chair icon.

The assembly 700 can be the same or similar in structure and/or function to any of the assemblies described herein, such as, for example, the assembly 100. For example, the assembly 700 includes multiple sets of musician seats multiple sets of audience seats. The multiple sets of musician seats includes a first set of musician seats 720, a second set of musician seats 722, a third set of musician seats 724, and a fourth set of musician seats 726. Each of the first set of musician seats 720, the second set of musician seats 722, the third set of musician seats 724, and the fourth set of musician seats 726 include two lines of musician seats extending radially away from a conductor position 710. The plurality of audience seats includes a first set of audience seats 740, a second set of audience seats 742, and a third set of audience seats 744. The first set of audience seats 740 is disposed between the first set of musician seats 720 and the second set of musician seats 722. The second set of audience seats 742 is disposed between the second set of musician seats 722 and the third set of musician seats 724. The third set of audience seats 744 is disposed between the third set of musician seats 724 and the fourth set of musician seats 726. Each of the first set of audience seats 740, the second set of audience seats 742, and the third set of audience seats 744 includes a plurality of rows of audience seats. The assembly 700 also includes a fifth set of musician seats 728 including a row of musician seats disposed behind the second set of audience seats 742, and a sixth set of musician seats 734 including four musicians M disposed behind the third set of musician seats 724.

The assembly 700 also includes a fourth set of audience seats 746, a fifth set of audience seats 748, a sixth set of audience seats 750, and a seventh set of audience seats 752. The assembly 700 also includes a seventh set of musician seats 730 disposed between the fourth set of audience seats 746 and the fifth set of audience seats 748 and an eighth set of musician seats 732 disposed behind the fifth set of audience seats 748. The fourth set of audience seats 746 and the fifth set of audience seats 748 each include a single row of audience seats and the seventh set of musician seats 730 includes a single row of musician seats. The sixth set of audience seats 750 and the seventh set of audience seats 752 can be the same or similar in structure and/or function to the eighth set of audience seats 150 and the ninth set of audience seats 152 described above with respect to the assembly 100. The assembly 700 also includes an eighth set of audience seats 760. The eighth set of audience seats 760 can be the same or similar in structure and/or function to the tenth set of audience seats 160 described above with respect to FIG. 1.

Figure 9:
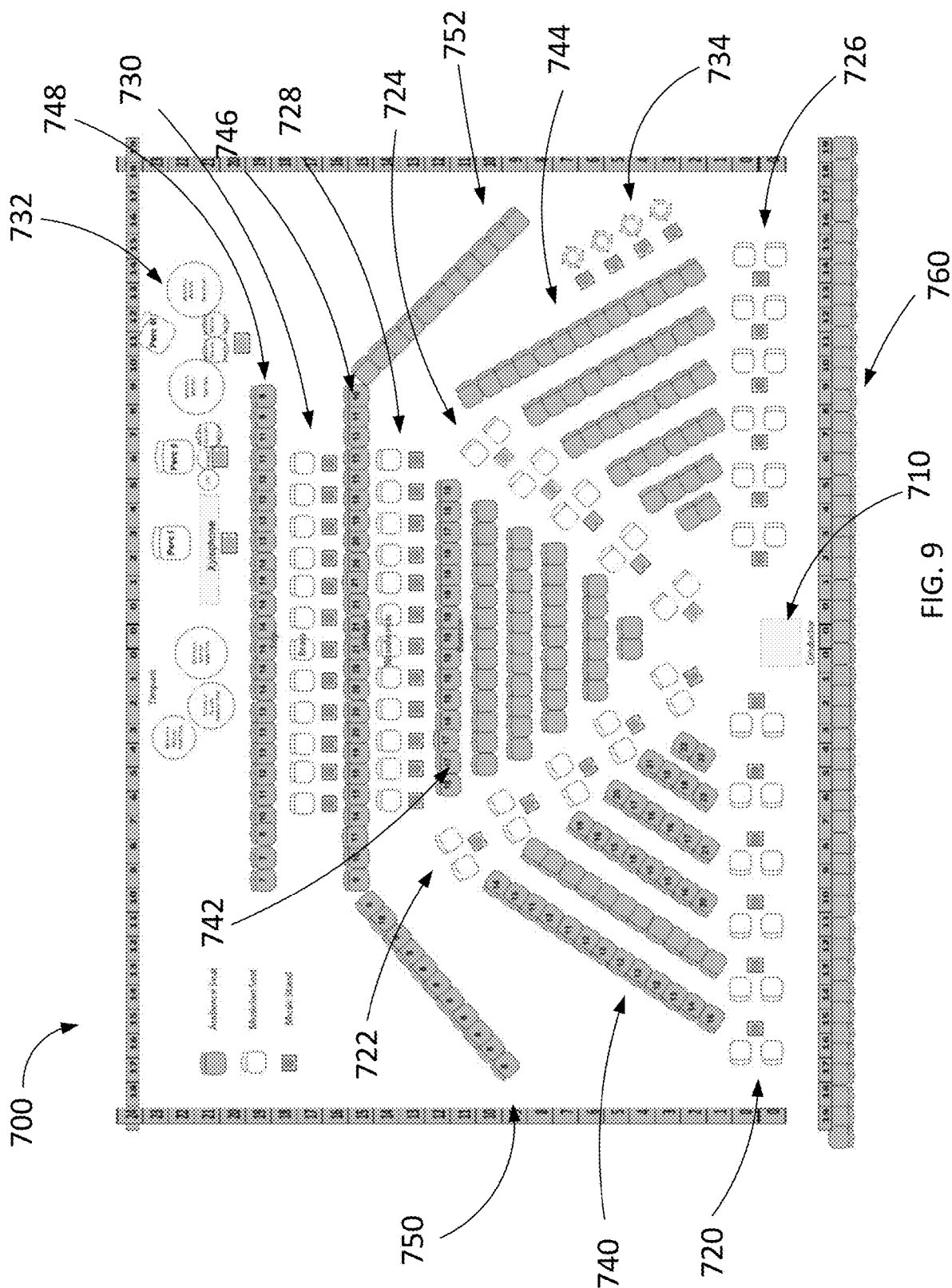
FIG. 9 is a schematic illustration of the assembly of FIG. 8 including a grid showing depth and lateral zones of an event surface, according to an embodiment.

FIG. 9 is a schematic illustration of the assembly 700 with a number of the audience seats labeled with the respective audience immersion score of each seat. Lateral zones LZ are identified and labeled along the upper horizontal axis and vertical zones VZ are identified and labeled along the side vertical axis.

FIG. 10 is a flow chart showing a method of assembling seats for an event location 800, according to an embodiment. The method 800 can be used to arrange any of the assemblies of audience seats and musician seats described herein. The method 800 includes, at 802, determining an audience immersion score for each audience seat of a plurality of audience seats including a first audience immersion score associated with a first audience seat of the plurality of audience seats and a second audience immersion score associated with a second audience seat of the plurality of audience seats. Each of the first audience immersion score and the second audience immersion score can include a musician adjacency component, a conductor position depth offset component, and a conductor position lateral offset component. At 804, an audience member can be assigned to the first audience seat of the plurality of audience seats for a first time period of an event. At 806, the audience member can be assigned to the second audience seat of the plurality of audience seats for a second time period of the event and not overlapping with the first time period based, at least in part, on the first audience immersion score and the second audience immersion score. At 808, an instruction can be provided to the audience member to move from the first audience seat to the second audience seat after the first time period and before the second time period. In some implementations, optionally, a ticket can be outputted indicating a first audience seat assignment for the first time period based on the assigning of the audience member to the first audience seat and indicating a second audience seat assignment for the second time period based on the assigning the audience member to the second audience seat for the second time period.

FIG. 11 is a flow chart showing a method of assembling seats for an event location 900, according to an embodiment. The method 900 can be used to arrange any of the assemblies of audience seats and musician seats described herein. The method 900 includes, at 902, disposing a plurality of musician seats including a first set of musician seats, a second set of musician seats, a third set of musician seats, and a fourth set of musician seats on an event location surface such that each of the first set of musician seats, the second set of musician seats, the third set of musician seats, and the fourth set of musician seats includes a line of musician seats extending radially away from a conductor position. At 904, an audience immersion score of a location on the event location surface can be calculated. The audience immersion score can include a musician adjacency component, a conductor position depth offset component, and a conductor position lateral offset component. At 906, whether the audience immersion score is above a threshold minimal acceptable audience immersion score (MAAIS) can be determined. At 908, in response to determining that the audience immersion score of the location is above the threshold MAAIS, an audience chair can be disposed at the location on the surface. In some implementations, if the audience immersion score of the location is below the threshold MAAIS, no audience chair is placed at the location on the surface.

FIG. 12 is a flow chart showing a method of assembling seats for an event location 1000, according to an embodiment. The method 1000 can be used to arrange any of the assemblies of audience seats and musician seats described herein. The method 1000 includes, at 1002, assigning an audience member to a first set of audience seats of a plurality of sets of audience seats for a first time period of an event. At 1004, the audience member can be assigned to a second set of audience seats of the plurality of sets of audience seats for a second time period of the event and not overlapping with the first time period based, at least in part, on a location of the first set of audience seats relative to one or more musician seats and a location of the second set of audience seats relative to one or more musician seats. At 1006, an instruction can be provided to the audience member to move from the first set of audience seats to the second set of audience seats after the first time period and before the second time period.

While various embodiments have been described above, it should be understood that they have been presented by way of example only, and not limitation. Where methods described above indicate certain events occurring in certain order, the ordering of certain events can be modified. Additionally, certain of the events can be performed concurrently in a parallel process when possible, as well as performed sequentially as described above.

Where schematics and/or embodiments described above indicate certain components arranged in certain orientations or positions, the arrangement of components can be modified. While the embodiments have been particularly shown and described, it will be understood that various changes in form and details can be made. Any portion of the apparatus and/or methods described herein can be combined in any combination, except mutually exclusive combinations. The embodiments described herein can include various combinations and/or sub-combinations of the functions, components, and/or features of the different embodiments described.

The invention claimed is:

1. An assembly of seats for an event location, the assembly comprising:
   a plurality of musician seats; and
   a plurality of audience seats, each audience seat of the plurality of audience seats disposed in a particularly designated location on an event location surface relative to the plurality of musician seats such that each audience seat of the plurality of audience seats has an audience immersion score that is above a threshold minimal acceptable audience immersion score (MAAIS) and that includes a musician adjacency component, a conductor position depth offset component, and a conductor position lateral offset component,
   for each audience seat from the plurality of audience seats:
      the musician adjacency component having a direct musician adjacency subcomponent based, at least in part, on a number of musician seats directly adjacent to that audience seat and an indirect musician adjacency subcomponent based, at least in part, on a number of musician seats indirectly adjacent to that audience seat,
the conductor position depth offset component based, at least in part, on a distance between a conductor position and that audience seat along a centerline of the assembly extending through the conductor position,
the conductor position lateral offset component based, at least in part, on a lateral distance between the centerline and that audience seat.

2. The assembly of claim 1, wherein a musician seat is indirectly adjacent to an audience seat when the musician seat is disposed two seats away from the audience seat along a radial line extending from the audience seat.

3. The assembly of claim 1, wherein the event location surface includes a plurality of non-overlapping depth zones, each zone associated with a different distance range from the conductor position along the centerline of the assembly, the conductor position depth offset component including a value associated with the zone within which each audience seat is disposed.

4. The assembly of claim 1, wherein the event location surface includes a plurality of non-overlapping lateral zones, each lateral zone associated with a different distance range from the centerline of the assembly, the conductor position lateral offset component including a value associated with the lateral zone within which each audience seat is disposed.

5. An assembly of seats for an event location, the assembly comprising:
a plurality of musician seats including:
a first set of musician seats;
a second set of musician seats;
a third set of musician seats; and
a fourth set of musician seats, each of the first set of musician seats, the second set of musician seats, the third set of musician seats, and the fourth set of musician seats including a line of musician seats extending radially away from a conductor position, and
a plurality of audience seats including:
a first set of audience seats disposed between the first set of musician seats and the second set of musician seats such that each seat from the first set of audience seats has an audience immersion score above a threshold minimal acceptable audience immersion score (MAAIS);
a second set of audience seats disposed between the second set of musician seats and the third set of musician seats such that each seat from the second set of audience seats has an audience immersion score above the threshold MAAIS; and
a third set of audience seats disposed between the third set of musician seats and the fourth set of musician seats such that each seat from the third set of audience seats has an audience immersion score above the threshold MAAIS.

6. The assembly of claim 5, wherein each of the first set of audience seats, the second set of audience seats, and the third set of audience seats includes a plurality of rows of audience seats, a row of audience seats for each of the first set of audience seats, the second set of audience seats, and the third set of audience seats disposed closest to the conductor position including fewer number of audience seats than remaining rows of audience seats from that set of audience seats.

7. The assembly of claim 5, wherein:
the plurality of musician seats includes a fifth set of musician seats including a row of musician seats, the row of musician seats of the fifth set of musician seats disposed perpendicular to a centerline of the assembly extending through the conductor position,
the first set of musician seats opposing the fourth set of musician seats about the centerline,
the second set of musician seats opposing the third set of musician seats about the centerline, the second set of audience seats bounded by the second set of musician seats, the third set of musician seats, and the fifth set of musician seats.

8. The assembly of claim 7, wherein the plurality of audience seats includes a fourth set of audience seats including a row of audience seats, the row of audience seats for the fourth set of audience seats disposed parallel to the row of musician seats of the fifth set of musician seats and opposite the row of musician seats of the fifth set of musician seats relative to the conductor position.

9. The assembly of claim 5, wherein each of the first set of musician seats, the second set of musician seats, the third set of musician seats, and the fourth set of musician seats includes two parallel lines of musician seats extending radially away from the conductor position.

10. The assembly of claim 5, wherein a set of music stands associated with musicians is disposed behind the third set of audience seats.

11. The assembly of claim 5, further comprising a solo musician seat disposed within the second set of audience seats such that the solo musician seat is surrounded by audience seats of the second set of audience seats.

12. An assembly of seats for an event location, the assembly comprising:
a plurality of musician seats including:
a first set of musician seats;
a second set of musician seats;
a third set of musician seats; and
a fourth set of musician seats, each of the first set of musician seats, the second set of musician seats, the third set of musician seats, and the fourth set of musician seats each including a line of musician seats extending radially away from a conductor position; and
a plurality of audience seats, each audience seat of the plurality of audience seats arranged in a particularly designated location relative to the plurality of musician seats such that each audience seat of the plurality of audience seats has an audience immersion score that is above a threshold minimal acceptable audience immersion score (MAAIS) and that includes a musician adjacency component, a conductor position depth offset component, and a conductor position lateral offset component.

13. A method of assembling seats for an event location, comprising:
disposing a plurality of musician seats including a first set of musician seats, a second set of musician seats, a third set of musician seats, and a fourth set of musician seats on an event location surface such that each of the first set of musician seats, the second set of musician seats, the third set of musician seats, and the fourth set of musician seats includes a line of musician seats extending radially away from a conductor position;
calculating an audience immersion score of a location on the event location surface, the audience immersion score including a musician adjacency component, a conductor position depth offset component, and a conductor position lateral offset component;

determining whether the audience immersion score is above a threshold minimal acceptable audience immersion score (MAAIS); and in response to determining that the audience immersion score of the location is above the threshold MAAIS, disposing an audience chair at the location on the surface.

14. The method of claim 13, wherein the audience immersion score is a first audience immersion score and the audience chair is a first audience seat of a plurality of audience seats, and further comprising:

determining a second audience immersion score associated with a second audience seat of the plurality of audience seats, the second audience immersion score including a musician adjacency component, a conductor position depth offset component, and a conductor position lateral offset component;

assigning an audience member to the first audience seat of the plurality of audience seats for a first time period of an event;

assigning the audience member to the second audience seat of the plurality of audience seats for a second time period of the event and not overlapping with the first time period based, at least in part, on the first audience immersion score and the second audience immersion score; and providing an instruction to the audience member to move from the first audience seat to the second audience seat after the first time period and before the second time period.

15. The method of claim 14, further comprising:

outputting a ticket indicating a first audience seat assignment for the first time period based on the assigning of the audience member to the first audience seat and indicating a second audience seat assignment for the second time period based on the assigning the audience member to the second audience seat for the second time period.

16. The method of claim 15, wherein the audience immersion score is a first audience immersion score and the audience chair is a first audience seat of a first set of audience seats of a plurality of sets of audience seats, and further comprising:

assigning an audience member to the first audience seat of the first set of audience seats of the plurality of sets of audience seats for a first time period of an event, the first audience seat having an audience immersion score within a range above a threshold audience immersion score;

assigning the audience member to a second seat of a second set of audience seats of the plurality of sets of audience seats for a second time period of the event and not overlapping with the first time period, the second seat having an audience immersion score within a range below the threshold audience immersion score; and providing an instruction to the audience member to move from the first audience seat to the second seat after the first time period and before the second time period.

17. The method of claim 16, wherein the instruction is a first instruction and the audience member is a first audience member, and further comprising:

providing a second instruction before providing the first instruction, the second instruction including an instruction to the audience member to move to a temporary location for a third time period, the third period of time of the event after the first time period and before the second time period;

assigning a second audience member to a third seat of a third set of audience seats of the plurality of sets of audience seats for the first time period of the event;

assigning the second audience member to a fourth seat of a fourth set of audience seats of the plurality of sets of audience seats for the second time period of the event;

providing a third instruction to the second audience member to move from the third seat to the fourth seat during the third time period of the event.

18. The method of claim 17, wherein the temporary location includes a plurality of audience seats.

19. The method of claim 17, wherein the third seat is the same as the second seat.

20. The method of claim 17, wherein the fourth seat is the same as the first seat.

* * * * *